US010462963B2

(12) United States Patent
Stoffel et al.

(10) Patent No.: US 10,462,963 B2
(45) Date of Patent: Nov. 5, 2019

(54) LASER CLAD CUTTING EDGE FOR AGRICULTURAL CUTTING COMPONENTS

(71) Applicants: Neal J. Stoffel, Campbellsport, WI (US); Juan G. Sotelo, Fond du Lac, WI (US); Keith A. Johnson, Kewaskum, WI (US); Michael A. Bechler, West Bend, WI (US)

(72) Inventors: Neal J. Stoffel, Campbellsport, WI (US); Juan G. Sotelo, Fond du Lac, WI (US); Keith A. Johnson, Kewaskum, WI (US); Michael A. Bechler, West Bend, WI (US)

(73) Assignee: Kondex Corporation, Lomira, WI (US)

( * ) Notice: Subject to any disclaimer, the term of this patent is extended or adjusted under 35 U.S.C. 154(b) by 465 days.

(21) Appl. No.: 15/043,185

(22) Filed: Feb. 12, 2016

(65) Prior Publication Data

US 2016/0157423 A1    Jun. 9, 2016

Related U.S. Application Data

(63) Continuation-in-part of application No. 13/787,122, filed on Mar. 6, 2013.
(Continued)

(51) Int. Cl.
*A01D 34/73*    (2006.01)
*B01F 7/00*     (2006.01)
(Continued)

(52) U.S. Cl.
CPC .............. *A01D 34/73* (2013.01); *A01F 29/09* (2013.01); *B01F 7/00616* (2013.01);
(Continued)

(58) Field of Classification Search
CPC ......... B21K 11/00; A01D 34/73; A01F 29/09; Y10T 83/9319; B26D 2001/002; B26D 1/006; B26D 2001/006; B23K 26/00
(Continued)

(56) References Cited

U.S. PATENT DOCUMENTS

| 2,529,797 A | 11/1950 | Cauble |
| 3,063,310 A | 11/1962 | Connoy |

(Continued)

FOREIGN PATENT DOCUMENTS

| CA | 2 866 594 A1 | 9/2013 |
| DE | 202010007393 U1 | 9/2010 |

(Continued)

OTHER PUBLICATIONS

Harvesting Equipment—Blades for Agricultural Rotary Mowers—Requirements; International Standard ISO 5718; Jul. 15, 2002; 10 pages; First edition; Geneva, Switzerland.
(Continued)

*Primary Examiner* — Ghassem Alie
(74) *Attorney, Agent, or Firm* — Reinhart Boerner Van Deuren P.C.

(57) ABSTRACT

An agricultural cutting blade has top and bottom surfaces and mounting apertures extending through top and bottom surfaces. A cutting edge support surface (e.g. that may be a flat, pointed or rounded) is formed on the cutting blade body with the cutting edge support extending along a side of the cutting blade body transversely between the top and bottom surfaces. A clad material deposited upon the cutting edge support such as by laser cladding process. The clad material can be built up, that is layered in partial or full overlapping relation to provide at least 2 and often more than 4 layers of
(Continued)

clad material at one or more locations. A cutting edge provided by the clad material that may be a ground surface into a laser clad bead.

22 Claims, 16 Drawing Sheets

Related U.S. Application Data

(60) Provisional application No. 61/607,220, filed on Mar. 6, 2012.

(51) Int. Cl.
<table><tr><td>C21D 9/00</td><td>(2006.01)</td></tr><tr><td>B23P 15/28</td><td>(2006.01)</td></tr><tr><td>A01F 29/09</td><td>(2010.01)</td></tr><tr><td>B23P 15/40</td><td>(2006.01)</td></tr><tr><td>B26D 1/00</td><td>(2006.01)</td></tr><tr><td>B01F 7/24</td><td>(2006.01)</td></tr><tr><td>B23K 31/02</td><td>(2006.01)</td></tr><tr><td>B23K 26/342</td><td>(2014.01)</td></tr></table>

(52) U.S. Cl.
CPC ............ *B01F 7/245* (2013.01); *B23K 31/025* (2013.01); *B23P 15/28* (2013.01); *B23P 15/40* (2013.01); *B26D 1/0006* (2013.01); *C21D 9/0068* (2013.01); *B23K 26/342* (2015.10); *B26D 2001/002* (2013.01); *B26D 2001/006* (2013.01); *Y10T 83/9319* (2015.04)

(58) Field of Classification Search
USPC ............... 83/835–845; 76/112, 104.1, 106.5; 299/105; 51/295; 30/350; 428/67, 690, 428/175, 917; 407/119, 113–116; 241/27, 101.761, 260.1, 300, 605, 292.1
See application file for complete search history.

(56) References Cited

U.S. PATENT DOCUMENTS

<table><tr><td>3,496,973 A *</td><td>2/1970</td><td>Ballard ................ B23D 61/026<br>125/15</td></tr><tr><td>3,635,271 A *</td><td>1/1972</td><td>Markham ............ A01F 29/095<br>241/101.762</td></tr><tr><td>3,859,865 A</td><td>1/1975</td><td>Conrad</td></tr><tr><td>3,882,579 A</td><td>5/1975</td><td>Peacock</td></tr><tr><td>3,937,317 A</td><td>2/1976</td><td>Fleury, Jr.</td></tr><tr><td>3,944,443 A</td><td>3/1976</td><td>Jones</td></tr><tr><td>4,304,978 A</td><td>12/1981</td><td>Saunders</td></tr><tr><td>4,416,656 A</td><td>11/1983</td><td>Shapiro</td></tr><tr><td>4,451,302 A</td><td>5/1984</td><td>Prescott et al.</td></tr><tr><td>4,466,533 A</td><td>8/1984</td><td>Shwayder</td></tr><tr><td>4,516,302 A</td><td>5/1985</td><td>Chulada et al.</td></tr><tr><td>4,530,204 A</td><td>7/1985</td><td>Brooks</td></tr><tr><td>4,645,404 A</td><td>2/1987</td><td>Juravic</td></tr><tr><td>4,660,361 A</td><td>4/1987</td><td>Remillard et al.</td></tr><tr><td>4,666,033 A</td><td>5/1987</td><td>Reid</td></tr><tr><td>4,842,126 A</td><td>6/1989</td><td>McConnell</td></tr><tr><td>4,909,026 A</td><td>3/1990</td><td>Molzahn et al.</td></tr><tr><td>4,949,836 A</td><td>8/1990</td><td>Schostek</td></tr><tr><td>5,016,747 A</td><td>5/1991</td><td>Veenhof</td></tr><tr><td>5,092,453 A</td><td>3/1992</td><td>Bruke</td></tr><tr><td>5,148,660 A *</td><td>9/1992</td><td>Will ........................ A01D 34/73<br>56/295</td></tr><tr><td>5,181,461 A</td><td>1/1993</td><td>Viaud</td></tr><tr><td>5,209,053 A</td><td>5/1993</td><td>Verbeek</td></tr><tr><td>5,213,202 A</td><td>5/1993</td><td>Arnold</td></tr><tr><td>5,444,969 A</td><td>8/1995</td><td>Wagstaff et al.</td></tr><tr><td>5,456,323 A *</td><td>10/1995</td><td>Hill ........................ A01B 15/04<br>172/721</td></tr><tr><td>5,673,618 A</td><td>10/1997</td><td>Little</td></tr><tr><td>5,823,449 A</td><td>10/1998</td><td>Kooima et al.</td></tr><tr><td>5,906,053 A</td><td>5/1999</td><td>Turner et al.</td></tr><tr><td>6,089,334 A</td><td>7/2000</td><td>Watts</td></tr><tr><td>6,155,705 A</td><td>12/2000</td><td>Douris et al.</td></tr><tr><td>6,402,438 B1</td><td>6/2002</td><td>Boyer</td></tr><tr><td>6,543,211 B1</td><td>4/2003</td><td>Talbot</td></tr><tr><td>6,594,975 B2</td><td>7/2003</td><td>Anstey et al.</td></tr><tr><td>6,623,876 B1</td><td>9/2003</td><td>Caron</td></tr><tr><td>6,681,692 B2 *</td><td>1/2004</td><td>Beran ................ B05C 11/045<br>101/157</td></tr><tr><td>6,857,255 B1</td><td>2/2005</td><td>Wilkey et al.</td></tr><tr><td>6,886,317 B2</td><td>5/2005</td><td>Jackson et al.</td></tr><tr><td>6,962,040 B2</td><td>11/2005</td><td>Talbot</td></tr><tr><td>7,179,023 B2 *</td><td>2/2007</td><td>Goudemond ......... B23B 27/141<br>407/119</td></tr><tr><td>7,478,522 B1</td><td>1/2009</td><td>Lovett et al.</td></tr><tr><td>7,677,843 B2</td><td>3/2010</td><td>Techel et al.</td></tr><tr><td>7,827,883 B1</td><td>11/2010</td><td>Cherng et al.</td></tr><tr><td>8,096,221 B2</td><td>1/2012</td><td>Tarrerias</td></tr><tr><td>8,353,148 B2</td><td>1/2013</td><td>Derscheid</td></tr><tr><td>8,464,506 B2</td><td>6/2013</td><td>Schumacher et al.</td></tr><tr><td>8,484,938 B2</td><td>7/2013</td><td>Cormier et al.</td></tr><tr><td>8,579,774 B2</td><td>11/2013</td><td>Derscheid</td></tr><tr><td>8,662,131 B2</td><td>3/2014</td><td>Cormier et al.</td></tr><tr><td>8,662,132 B2</td><td>3/2014</td><td>Cormier et al.</td></tr><tr><td>9,038,359 B2</td><td>5/2015</td><td>Augustine et al.</td></tr><tr><td>2001/0004826 A1</td><td>6/2001</td><td>Neuerburg</td></tr><tr><td>2002/0131328 A1</td><td>9/2002</td><td>Bowens et al.</td></tr><tr><td>2002/0136083 A1</td><td>9/2002</td><td>Haberer</td></tr><tr><td>2003/0066391 A1</td><td>4/2003</td><td>Griffo et al.</td></tr><tr><td>2003/0101706 A1</td><td>6/2003</td><td>Kenny</td></tr><tr><td>2005/0241440 A1</td><td>11/2005</td><td>Beck</td></tr><tr><td>2005/0250427 A1 *</td><td>11/2005</td><td>Freyvogel ............. A01D 34/73<br>451/344</td></tr><tr><td>2006/0168933 A1</td><td>8/2006</td><td>Hill, Jr.</td></tr><tr><td>2006/0213342 A1 *</td><td>9/2006</td><td>Turner ................ A01D 34/005<br>83/13</td></tr><tr><td>2007/0163128 A1 *</td><td>7/2007</td><td>Tarrerias ................ B23D 65/00<br>30/350</td></tr><tr><td>2007/0261867 A1</td><td>11/2007</td><td>Techel et al.</td></tr><tr><td>2008/0006016 A1</td><td>1/2008</td><td>Snider et al.</td></tr><tr><td>2008/0034567 A1</td><td>2/2008</td><td>Galbreath et al.</td></tr><tr><td>2008/0078656 A1</td><td>4/2008</td><td>Rhodea et al.</td></tr><tr><td>2009/0095214 A1</td><td>4/2009</td><td>Whitfield</td></tr><tr><td>2009/0322143 A1</td><td>12/2009</td><td>Krauter</td></tr><tr><td>2011/0009251 A1</td><td>1/2011</td><td>Derscheid</td></tr><tr><td>2011/0067374 A1</td><td>3/2011</td><td>James et al.</td></tr><tr><td>2012/0060379 A1</td><td>3/2012</td><td>Culf</td></tr><tr><td>2012/0063871 A1</td><td>3/2012</td><td>Wood</td></tr><tr><td>2012/0233974 A1</td><td>9/2012</td><td>Cormier et al.</td></tr><tr><td>2013/0032047 A1</td><td>2/2013</td><td>Marques et al.</td></tr><tr><td>2013/0111863 A1</td><td>5/2013</td><td>Johnson et al.</td></tr><tr><td>2013/0233145 A1</td><td>9/2013</td><td>Sotelo et al.</td></tr><tr><td>2014/0026716 A1 *</td><td>1/2014</td><td>Kasonde ................ B23P 15/32<br>76/108.6</td></tr><tr><td>2014/0041537 A1</td><td>2/2014</td><td>Hubach et al.</td></tr><tr><td>2014/0045562 A1</td><td>2/2014</td><td>Adamczyk et al.</td></tr><tr><td>2014/0130473 A1</td><td>5/2014</td><td>Augustine et al.</td></tr><tr><td>2014/0215787 A1</td><td>8/2014</td><td>Wada et al.</td></tr><tr><td>2014/0373501 A1</td><td>12/2014</td><td>McLawhorn et al.</td></tr><tr><td>2015/0319922 A1</td><td>11/2015</td><td>Stoffel et al.</td></tr><tr><td>2015/0319923 A1</td><td>11/2015</td><td>Stoffel et al.</td></tr><tr><td>2016/0309648 A1</td><td>10/2016</td><td>Stoffel et al.</td></tr><tr><td>2016/0360695 A1</td><td>12/2016</td><td>Klackensjö</td></tr></table>

FOREIGN PATENT DOCUMENTS

<table><tr><td>EP</td><td>0462484 A2</td><td>12/1991</td><td></td></tr><tr><td>EP</td><td>0726117 *</td><td>8/1996</td><td>............... B23K 9/04</td></tr><tr><td>EP</td><td>2 200 914</td><td>3/2009</td><td></td></tr><tr><td>EP</td><td>2 371 205 A1</td><td>10/2011</td><td></td></tr><tr><td>EP</td><td>2 499 896 A1</td><td>9/2012</td><td></td></tr><tr><td>JP</td><td>7-24986</td><td>6/1995</td><td></td></tr><tr><td>JP</td><td>3382730 B2</td><td>3/2003</td><td></td></tr><tr><td>JP</td><td>2006020531 A</td><td>1/2006</td><td></td></tr><tr><td>JP</td><td>2009011223 A</td><td>1/2009</td><td></td></tr><tr><td>JP</td><td>2009126608 A</td><td>6/2009</td><td></td></tr></table>

(56) References Cited

FOREIGN PATENT DOCUMENTS

| RU | 2555268 C2 | 7/2015 |
| WO | WO 90/14755 A1 | 12/1990 |
| WO | WO 2013/134397 A1 | 9/2013 |

OTHER PUBLICATIONS

Hyungson Ki et al.; Process map for laser heat treatment of carbon steels; Optics & Laser Technology; 2012, 9 pages (2106-2114) vol. 44.
Sangwoo So et al.; Effect of specimen thickness on heat treatability in laser transformation hardening; International Journal of Heat and Mass Transfer; 2013; 11 pages (266-276); vol. 61.
U.S. Appl. No. 13/787,122, filed Mar. 6, 2013.

\* cited by examiner

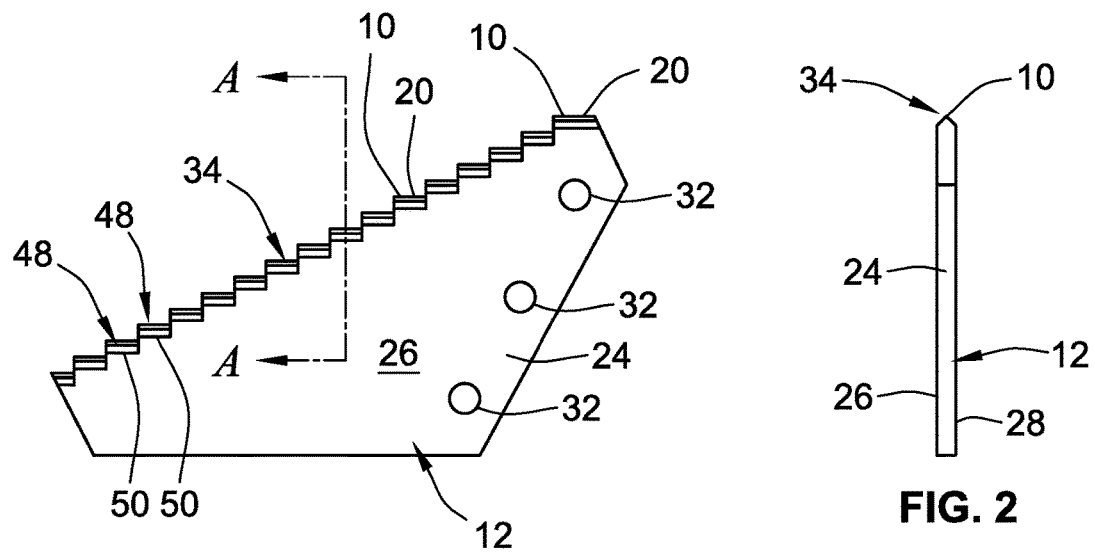
FIG. 1
FIG. 2
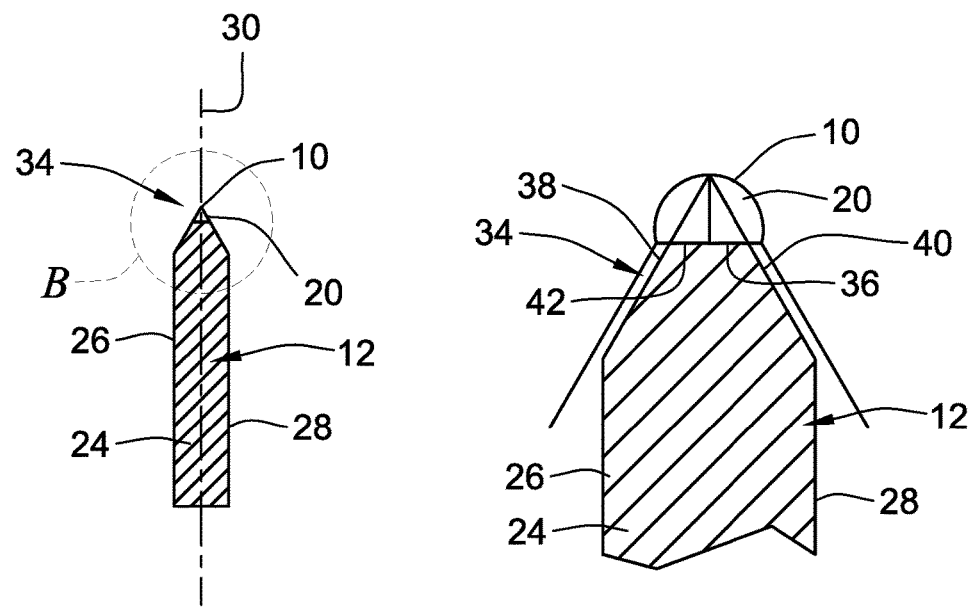
FIG. 3
FIG. 4

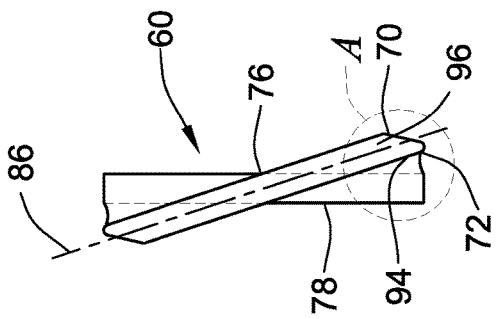
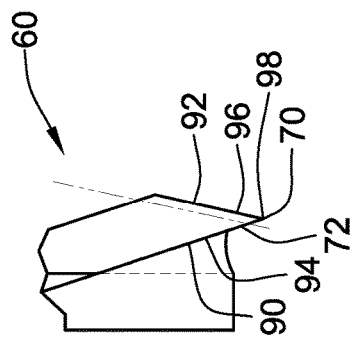
FIG. 7
FIG. 8
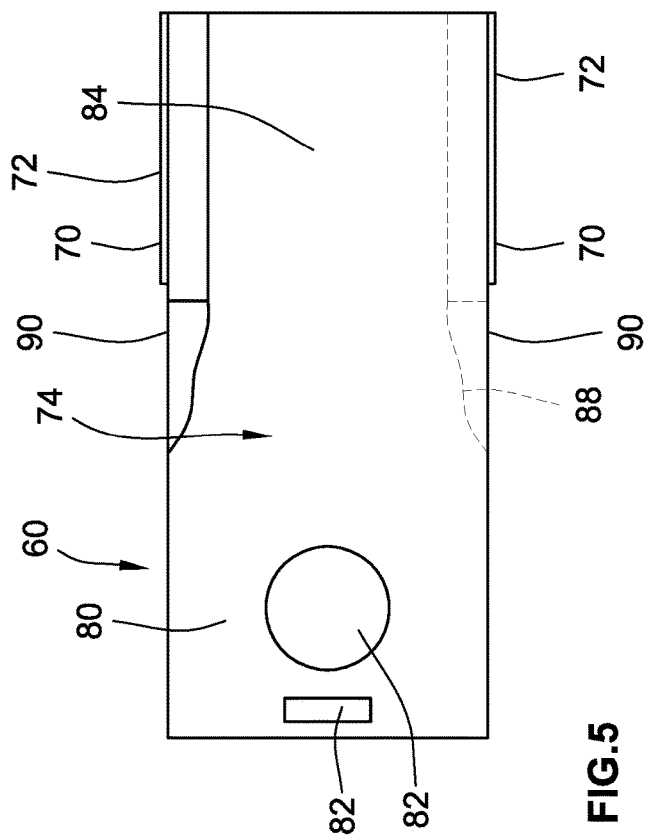
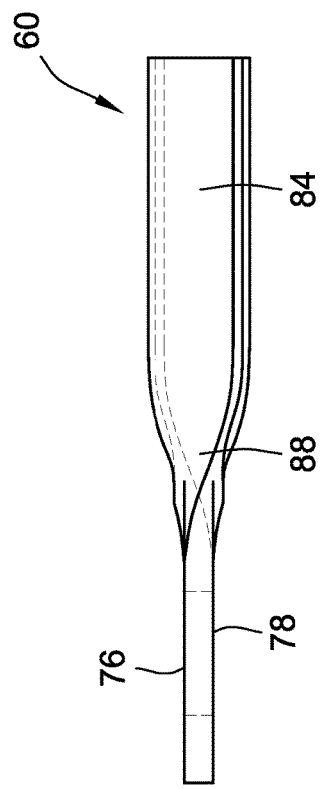
FIG. 5
FIG. 6

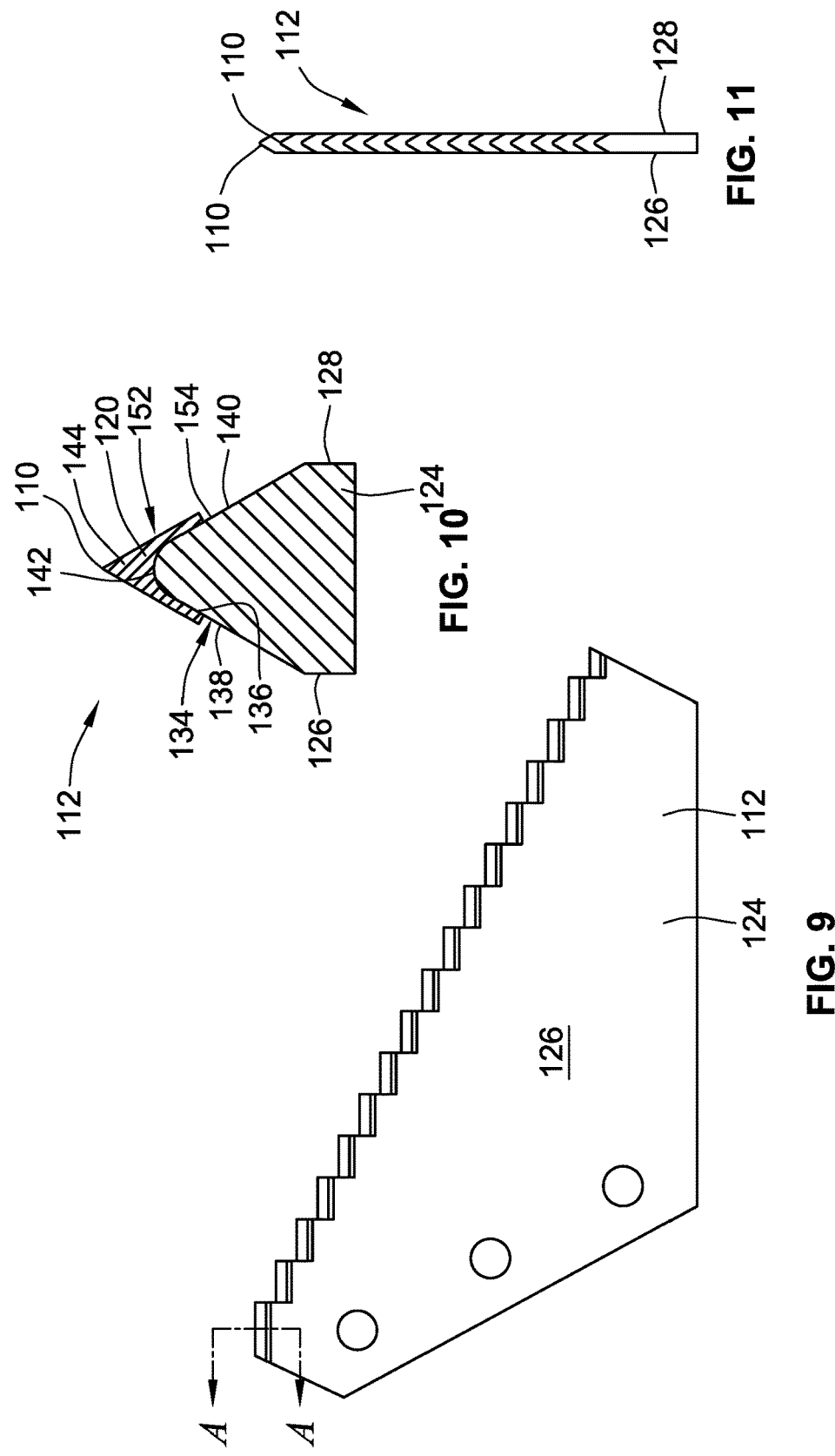

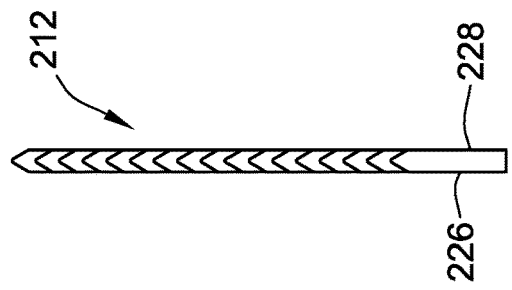
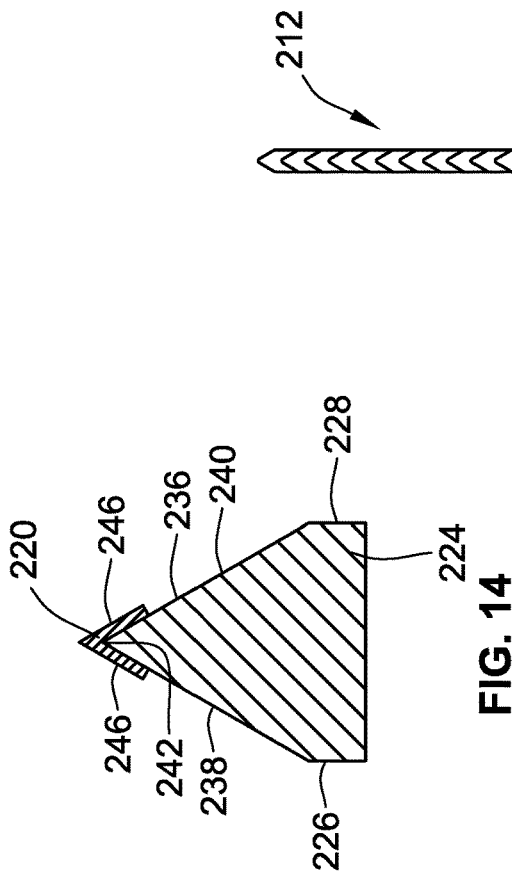
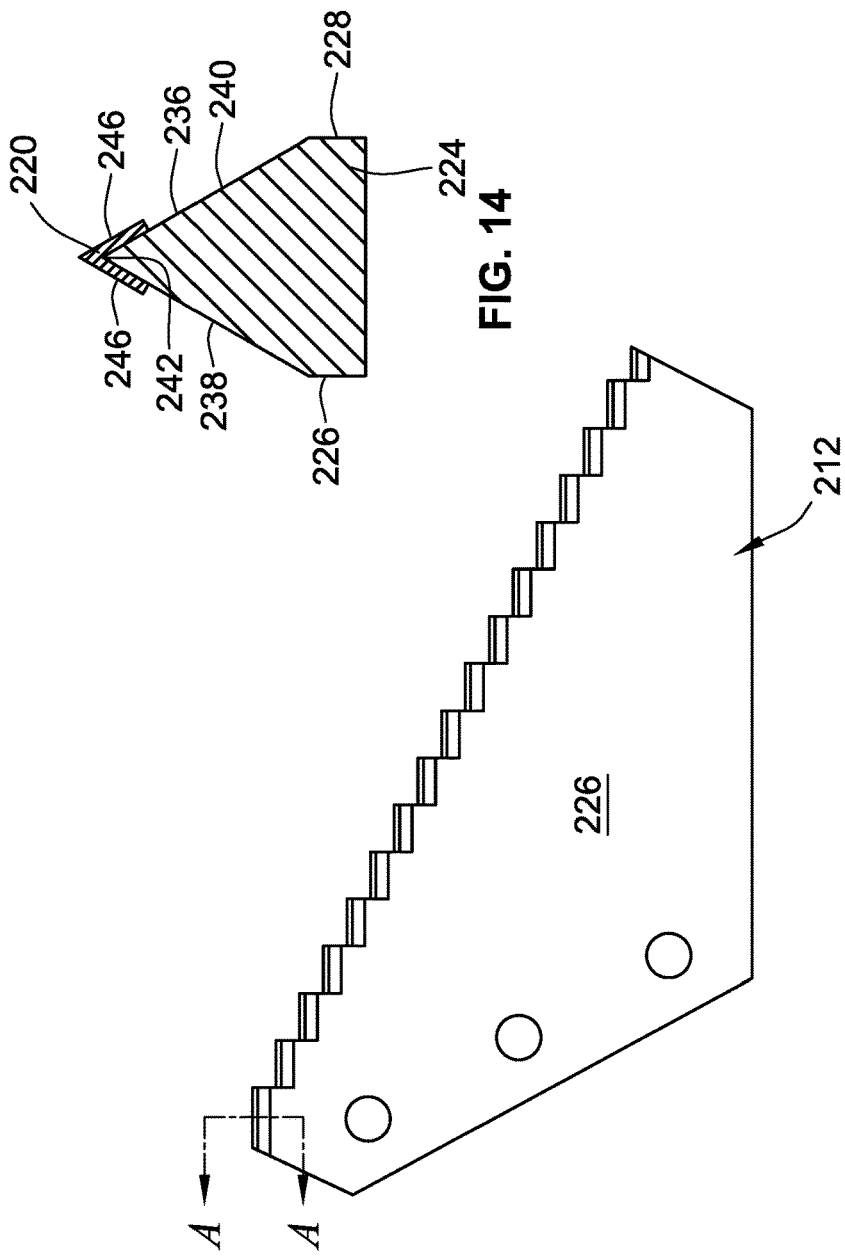

LASER CLAD CUTTING EDGE FOR AGRICULTURAL CUTTING COMPONENTS

CROSS-REFERENCE TO RELATED PATENT APPLICATIONS

This patent application is a continuation-in-part of U.S. patent application Ser. No. 13/787,122, filed Mar. 6, 2013, which claims the benefit of U.S. Provisional Patent Application No. 61/607,220, filed Mar. 6, 2012, the entire teachings and disclosures of which are incorporated herein by reference thereto.

FIELD OF THE INVENTION

This invention generally relates to a laser clad cutting edge for agricultural cutting components.

BACKGROUND OF THE INVENTION

Laser clad technology on cutting implements is known as suggested by U.S. Pat. No. 7,677,843 to Techel et al., the entire disclosure of which is hereby incorporated by reference. The present disclosure takes a much different, improved and novel approach to cutting implements, which particular application and benefit in agricultural blades (also referred to as cutting blades), but that also may be used in paper blades, forestry related blades, plastic processing blades and the like.

Other prior publication includes U.S. 2007/0163128 to Tarrerias the entire disclosure of which is also incorporated by reference. However, that is limited to applications with a single strength linear cutter edge, and not envisioned for agricultural crops such as hay, stalk or silage; such as may be used in feed mixers. A concept for feed mixers is shown in U.S. Pat. No. 5,823,449, however, that relies upon brazing on solid carbide.

BRIEF SUMMARY OF THE INVENTION

This invention is to aid in the prevention of premature wear and dulling to the cutting edge of agricultural blades. The design being proposed will reduce the wear of the cutting edge most commonly caused by the continuous cutting of crops or other commodities. Also, another major factor in the premature dulling of the blade that this invention will help prevent is chipping from foreign materials such as rocks, stones, or ice contacting the blade edge causing damage to the blade edge reducing the blades ability to cut effectively. A further benefit of this invention is the prevention of erosion of the cutting blade body at the base of the cladding.

One aspect of the present invention is directed toward a method of providing a cutting blade that includes cladding at least two layers of clad material upon a cutting edge support surface. The method includes providing a cutting blade with a cutting blade body having first and second side surfaces, the cutting blade body being formed of a first material such as steel. A cutting edge support surface is formed along the cutting blade body. The cutting edge support surface extends along an end surface of the cutting blade body transversely between the first and second side surfaces. The method further includes cladding at least two layers upon the cutting edge support surface to form a tip of a second material that provides at least one of a greater hardness and wear resistance relative to the first material. For example, the second material may include at least one of the following, tungston carbide, titanium carbide, chrome carbide, iron carbide, diamond, ceramic or other material having a Vickers scale hardness between HV 1200-2500. Thereafter, the tip may be sharpened to form a cutting edge in the second material.

Another inventive aspect of the present invention is directed to a method comprising laser cladding clad material onto a cutting edge support surface at two different locations, which may comprise approaches from alternating sides of the cutting blade body, or otherwise in different locations such as on top of each other and/or at discrete locations. The method includes providing a cutting blade with a cutting blade body having first and second side surfaces. The cutting blade body is formed from a first material and has a cutting edge support formed thereon. The cutting edge support surface extends along an end surface of the cutting blade body transversely between the first and second side surfaces. The method further includes laser cladding at a first location, a second material upon the cutting edge support surface. The second material that provides at least one of a greater hardness and wear resistance relative to the first base material of the cutting blade. Further, the method envisions laser cladding at a second location, the second material on the cutting edge support surface. Finally, the method may include sharpening at least one cutting edge into the second material.

Certain aspects of the present invention are also directed toward the apparatus. For example, one aspect is directing toward a cutting blade comprising a cutting blade body having first and second side surfaces and mounting apertures extending through the first and second side surfaces. The cutting edge support surface is formed on the cutting blade body. The cutting edge support surface extends along a side of the cutting blade body transversely between the first and second side surfaces. The clad material is deposited upon the cutting edge support surface. The cutting edge is provided by the clad material in which the cutting edge comprises at least one of a plurality of discrete edge segments and at least one non-linear edge.

Another aspect of the present invention is directed toward a cutting blade comprising a cutting blade body having first and second side surfaces and mounting apertures extending through the first and second side surfaces. A cutting edge support surface is formed on the cutting blade body that extends along an end surface of the cutting blade body transversely between the first and second side surfaces. The clad material build up is provided comprising a plurality of layers including a first layer that is depositing upon the cutting edge support surface and a second layer that is at least partially overlapping the first layer. For example, the second layer may be placed side by side with the first layer in contact and/or on top of the first layer in full or partial overlap. A cutting edge is provided by the clad material.

Additional aspects of the present invention are directed to a rotary cutting blade. The rotary cutting blade includes a cutting blade body having a first side surface and a second side surface. The cutting blade body is formed of a first material. The cutting blade body also includes a beveled surface portion between the first side surface and the second side surface, so that the intersection between the beveled surface portion and the second side surface defining a cutting edge. A second material is applied the beveled surface portion so that the second material covers at least 25 percent of the beveled surface portion. The second material provides at least one of greater hardness and wear resistance relative to the first material.

In one aspect of the invention, the second material is a laser cladding material.

In another aspect of the invention, the cutting blade body includes a mounting aperture and a plane of rotation, and the second side surface is parallel to the plane of rotation.

In another aspect of the invention, the cutting blade body includes a mounting aperture and a plane of rotation. The second side surface is not parallel to the plane of rotation, and is a protected surface when the rotary cutting blade is rotated in the plane of rotation.

In another aspect of the invention, the second material does not extend onto the second side surface.

In another aspect of the invention, the second material is applied to the beveled surface portion at a first thickness proximate to the cutting edge, and at a second thickness distal to the cutting edge. In some embodiments, the first thickness is greater than the second thickness. The first thickness may be between 0.3 mm and 3.0 mm, and the second thickness is between 0.3 mm and 3.0 mm.

In another aspect of the invention, the rotary cutting blade is heat treated. In some embodiments, the rotary cutting blade is austempered.

In a preferred aspect of the invention, the second material contacts the cutting edge.

In another aspect of the invention, the second material covers at least 50 percent of the beveled surface portion. In yet another aspect of the invention, the second material covers at least 80 percent of the beveled surface portion.

In another embodiment of the present invention, a method of forming a rotary cutting blade is provided. The method includes the step of providing a cutting blade having a cutting blade body. The cutting blade body includes a first side surface and a second side surface, wherein the cutting blade body is formed of a first material. The method also includes the step of providing a beveled surface portion between the first side surface and the second side surface, wherein the intersection of the second surface and the beveled cutting surface define a cutting edge. The method further includes laser cladding a second material to the beveled surface portion, wherein the second material does not extend onto the second side surface.

In one aspect of the method, the rotary cutting blade is heat treated after laser cladding. In some aspects of the method, a portion of the rotary cutting blade is heat treated after laser cladding. In another aspect of the method, the entire rotary cutting blade is austempered to a hardness lower than the first hardness.

In another embodiment of the present invention, a rotary cutting blade is provided. The rotary cutting blade includes a generally planar top surface and a generally planar bottom surface. The generally planar bottom surface is parallel to a rotational plane of the rotary cutting blade. The rotary cutting blade also includes a beveled surface portion between the top surface and the bottom surface, the intersection between the beveled surface portion and the bottom surface defining a cutting edge. The rotary cutting blade also includes a hard facing material applied to the beveled surface portion, wherein the hard facing material does not extend to cover the generally planar bottom surface.

In one aspect, the entire rotary cutting blade is heat treated.

In another aspect, one or more portions of the rotary cutting blade are heat treated.

In other aspects, a hard facing material is applied to the beveled surface portion at a first thickness proximate to the cutting edge, and a second thickness distal to the cutting edge.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 1 is a top view of an augur knife (also referred to as "mixer blade") having a plurality of laser clad cutting edges formed thereon in accordance with a first embodiment of the present invention;

FIG. 2 is a side view of the auger knife shown in FIG. 1;

FIG. 3 is a cross section view taken about A-A in FIG. 1;

FIG. 4 is an enlarged detail view taken about circle B in FIG. 3, shown in partial schematic shown before and after sharpening with the portion that is being ground off during sharpening being shown as well as lines indicating profile after sharpening;

FIG. 5 is a top view of a clock-wise knife (also referred to as "crop cutting blade") having a laser clad cutting edge in accordance with a second embodiment of the present invention;

FIG. 6 is a front side view of the blade shown in FIG. 5;

FIG. 7 is a right hand side view of the blade shown in FIG. 5;

FIG. 8 is an enlarged detail view of a portion of the knife taken about circle A in FIG. 7;

FIG. 9 is a top view of an alternative embodiment of a mixer blade similar to the first embodiment of FIG. 1, but employing different laser cladding;

FIG. 10 is a side view of the mixer blade shown in FIG. 9;

FIG. 11 is a cross-section taken about section A-A in FIG. 9;

FIG. 12 is a top view of an mixer blade similar to FIGS. 1 and 9, but employing yet a further alternative embodiment of the present invention with a different cutting edge support surface and laser cladding profile;

FIG. 13 is a side view of the blade shown in FIG. 12;

FIG. 14 is a cross-section taken about section A-A in FIG. 12;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Embodiments of the recent invention are designed to improve the surface properties related to the wear characteristics of metals used to manufacture agricultural cutting blades. This design specifically targets the cutting edge of agricultural blades and replaces that edge by building an edge on the blade using hard/wear resistant materials deposited using laser cladding technology.

It is common in today's industry to apply hard coatings on the top of or behind the cutting edge of the blade/knife. Also, it is common to see inserts brazed onto the cutting edge of the blade. Embodiments of the present invention differ from these already common concepts by using laser cladding technology to create the actual cutting edge of the knife and not to support an existing edge.

The hard/wear resistant laser clad material being referred to in various embodiments of the invention is material composed of a medium to high percentage of hard particles. These hard particles can be: Tungsten Carbide, Titanium Carbide, Chrome Carbide, Iron Carbide, Diamond, Ceramics, or any other high hardness particles in the range of HV 1200-2500 (Vickers scale hardness). The high hardness particles are then bonded and held in place by a base material composed of various metal alloys.

Laser cladding is the process of cladding material with the desired properties and fusing it onto the substrate by means of a laser beam. Laser cladding can yield surface layers that when compared to other hard facing techniques or standard blade material can have superior properties in terms of hardness, bonding, corrosion resistance and microstructure.

The design being introduced is to create a surface on the existing blade where an amount of laser cladding can be targeted and built up (e.g. as separate stacked layers and/or at different locations and/or approaches) to form a blunt bead of laser cladding along an edge that will become the cutting edge of the blade. Once the laser cladding material has been applied to the desired surface a second operation can be performed to create a sharp cutting edge. This secondary sharpening operation would include but not be limited to machining, grinding, and lapping.

Figure 15:
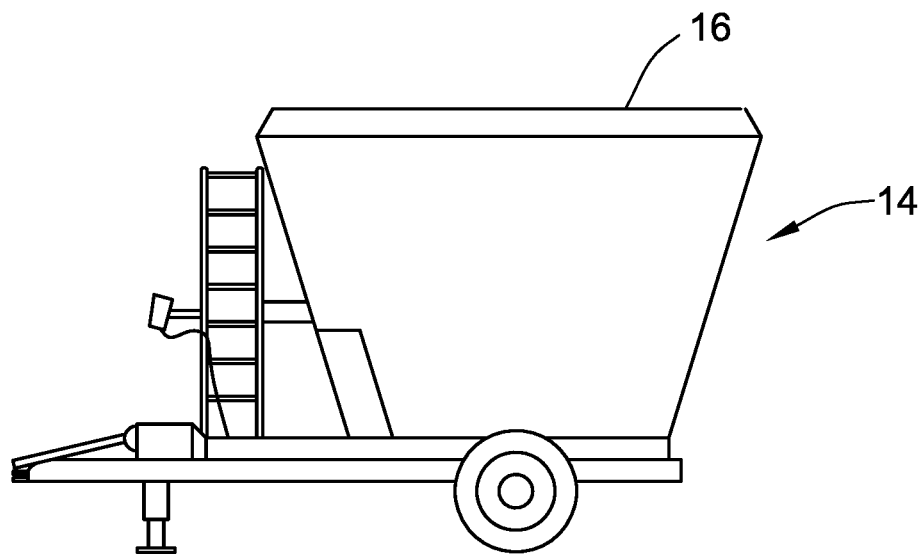
FIGS. 15 and 16 are side elevation and top views of a feed mixer employing the mixer blade of any of embodiments of the auger knife discussed above.
Figure 16:
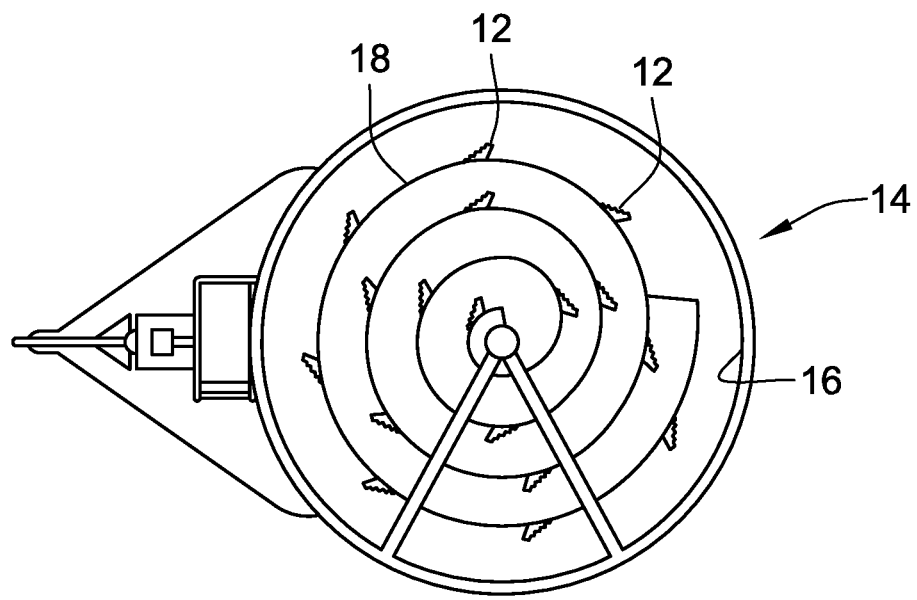

One embodiment for this invention is a laser clad cutting edge 10 on a mixer blade 12 used in an agricultural feed mixer 14. As shown in FIGS. 15-16, these feed mixers 14 are large heavy duty steel constructed chambers used to mix bales of hay, long roughage and other commodities. Inside these chambers 16 are large augers 18 with steel blades attached to each auger. The auger design along with the blade profile and pattern come in a variety of configurations and options depending on the feed mixer. The main purpose of the mixer blades 12 is to continuously and efficiently cut while also mixing the selected commodity. For these blades to perform at a high level they need to hold a cutting edge that allows for the cutting/mixing process to take place.

This use of laser cladding build up 20 to create the cutting edge 10 greatly aids in the blades 12 effectiveness to perform under multiple circumstances for longer periods of time. Using laser cladding as a way to create the cutting edge 10 has multiple key advantages in this application. First, due to the increased surface properties of the cutting edge the blade will hold its sharpness for a longer period of time. This in turn prevents the blade from being re-sharpened or replaced as often as a standard mixer blade. Second, with the improved properties of the blade edge the mixer does not require as much torque to cut and mix resulting in less horsepower used to run the equipment. With less horsepower being consumed by the mixer this will ultimately save the operator money in fuel consumption. Lastly, another key element in using laser cladding to create the blade edge is the bonding characteristics of the laser cladding process. This helps prevent any chipping of material or insert breakage commonly seen with current inserted mixer blades on the market today. The style of mixer blade that uses brazed inserts as its cutting edge can be susceptible to the insert breaking off from the blade body and entering the mix. This leaves the cattle or livestock vulnerable to consuming and digesting these foreign objects that were introduced to their feed.

Turning in greater detail to the cutting blade, which is shown as a mixer blade 12 in FIGS. 1-4, it can be seen that it is provided with a cutting blade body 24. The cutting blade body 24 includes opposite top and bottom side surfaces 26, 28 that generally define and/or are aligned generally parallel with each other and the main plane 30 of the overall body 24. The cutting blade body 24 may be formed of stock steel material and formed as a blank created from sheet or plate stock material. Three specifically arranged and aligned mounting holes 32 are provided, which correspond to mounting studs (e.g. mounting studs having this corresponding pattern and alignment and spacing) on the agricultural feed mixer 14 shown in other figures (see e.g. FIGS. 15 and 16).

The cutting blade body is provided at its periphery end surface 34 with a cutting edge support surface 36 upon which the laser cladding buildup 20 can be built. The periphery end surface 34 generally extends transverse and typically perpendicular between the top side surface 26 and bottom side surface 28. It should be noted that the cutting edge support surface can include first and second converging surfaces that are joined at an end tip 42, which in this case is a flat surface bridging the distance between the converging surfaces 38, 40. In this embodiment, each converging surface 38, 40 projects from the top side surface 26 and bottom side surface 28, respectively, at oblique angles. Thus, the converging surfaces generally extend toward the other side surface. It is also envisioned, however, that one of the converging surfaces may simply be a portion top or bottom side surfaces 26, 28 generally at the proximity of the cutting edge 10 and at the location of the peripheral end surface 34. In this alternative embodiment, there might be one converging edge at an oblique angle that extend toward the other side surface and a corresponding span along the main plane of which would be and provide for the second converging surface provided by the end portion of one of the top or bottom side surfaces 26, 28.

Figure 20:
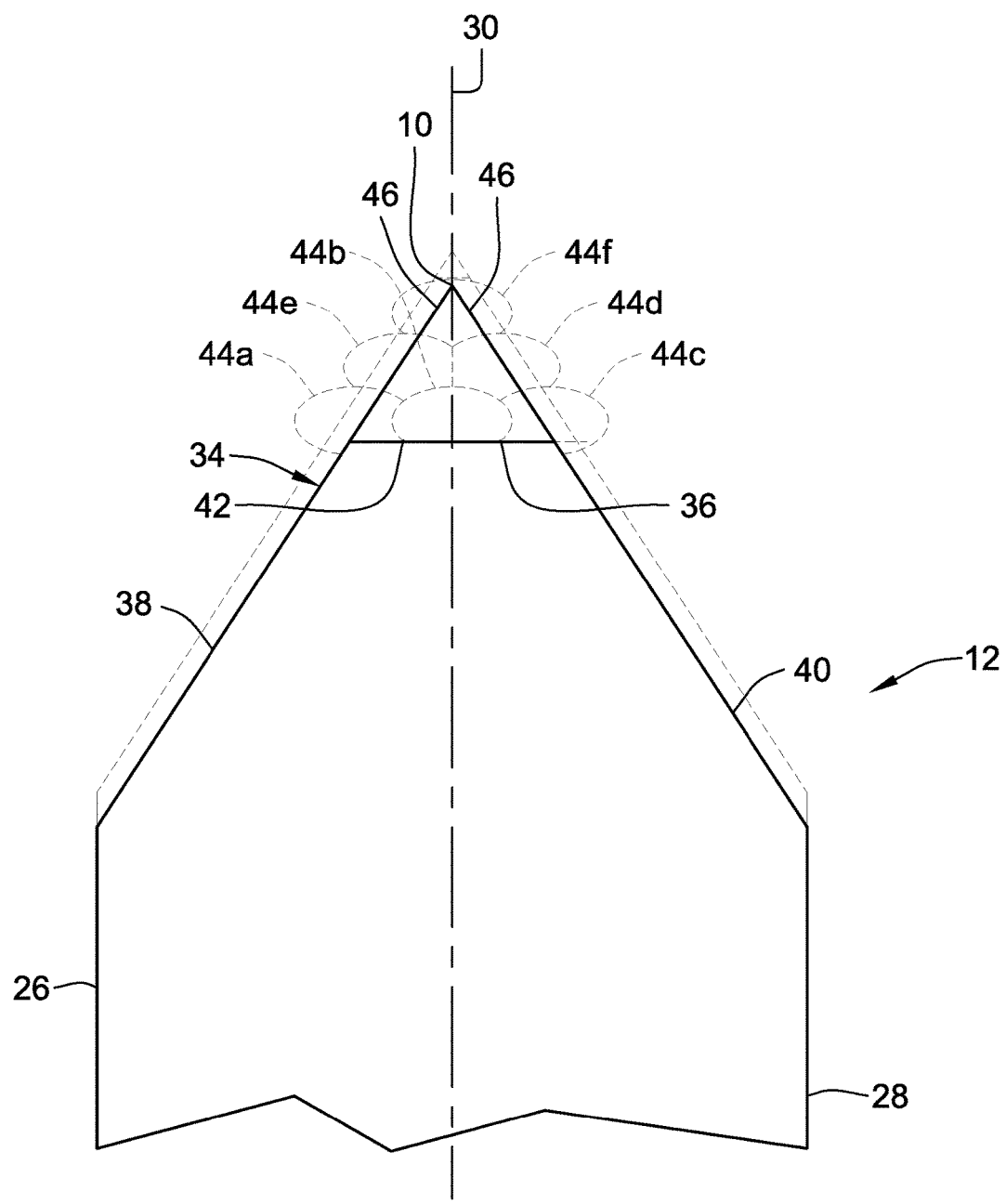
FIG. 20 is another cross section and partly schematic view of methodology for laying multiple laser clad beads upon the cutting edge support surface in accordance with a further embodiment of the present invention, with dashed lines illustrating the outline before sharpening and solid lines showing after sharpening.
Figure 22:
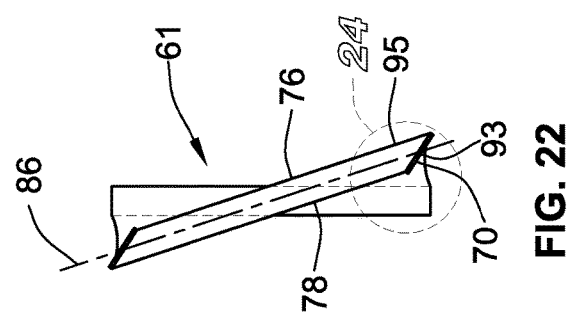
FIG. 22 is a right hand side view of the blade shown in FIG. 21.

To provide for the laser clad cutting edge 10, first, laser cladding is built up upon the cutting edge support surface 36 to provide laser cladding buildup 20, which may comprise several layers 44a-f of laser cladding in overlap as shown in FIG. 20. The length of each layer (also may be referred to as a bead) is laid longitudinally and thereby run along the cutting edge generally parallel thereto. By generally parallel, it is meant parallel or about parallel (for example less than 20 degrees difference). Layers are laid to the base steel blade material side by side overlapping each other at adjacent sides to cover the base metal material, and layers are also built on top of earlier laid layers that do not touch the base metal and are laser clad layers in overlap in complete overlapping relation. As shown in this embodiment, 2 or more, typically at least four layers and as shown, six layers in an embodiment, which are built up upon each other by virtue of multiple passes of a laser cladding tool over the different adjacent side by side locations and/or over the top at the same location as shown in this embodiment or alternatively other in different locations and/or from different approaches as shown in other embodiments discussed herein.

As shown in this embodiment, the laser cladding buildup 20 is generally confined to the flat end tip 42, but it may also overlap and extend upon the first and second converging surfaces 38, 40. By extending over the converging surfaces as shown in other embodiments, an advantage is gained during use in agricultural applications in that erosion of the base steel substrate material is prevented or minimized along the converging sides during use and contact with agricultural stalk and crop material, especially at the interface between the cladding material and the base steel material.

After the laser cladding buildup 20 is provided with multiple layers 44 built upon each other in side by side relation and/or on top of each other, then sharpening of the buildup material may be conducted such as by a grinder or other operation to remove material along opposed side of the laser cladding buildup 20 to create converging flanks that meet at a sharpened tip, which forms the laser clad cutting edge 10. In some embodiments, the flanks at the base or intersection where the laser cladding buildup is joined to the end tip, the flanks may create a wider span in cross section as compared with the span of the end tip 42. As a result, any laser clad material remaining on the first or second converging surfaces 38, 40 may remain such that the laser clad material forms an enlarged sharpened head overlaid upon the end tip 42 and where the laser cladding material ends, a reduced neck region may be formed. Alternatively, the material may be removed and sharpened down to the same profile as the existing converging surfaces 38, 40 on the preformed blank or may be ground even further to reduce converging surfaces 38 and 40 further.

Typically, and for different embodiments discussed herein, the end tip 42 may span between 0 and 0.2 inches. The flank length of each converging flank 46 may be between 0.1 and 0.5 inches. Typically, the laser clad buildup from the terminating apex of the end tip 42 to the outer most extent of the laser clad buildup (e.g. a maximum thickness measured perpendicular to main plane of the laser cladding material may be between 0.05 and 0.3 inches). Individual bead layers may be laid with a thickness between ¼-3 millimeters and a width between 1 millimeter and 5 millimeters typically (although other machines may lay beads thicker and up to ¾ inch wide). The length of any individual layer will depend and typically correspond to the corresponding length of the cutting edge may between ½ inch and 20 inches long. Typically the bead will run a length at least 5 times as long as it is wide. These parameters may apply to any embodiment discussed herein.

Another feature that is provided as well as inventive aspect is the provision for laying the laser cladding at more than one location on the cutting blade body 24. For example, the cutting blade body is provided with multiple teeth arranged along the outer peripheral end surface 34, which provide different cutting edge segments 50 that make up the laser clad cutting edge 10. Thus, the laser cladding is not limited to one location, but can be applied at multiple locations in this manner as well.

Turning to FIGS. 9-11, an alternative embodiment of a mixer blade 112 is illustrated that is similar in all respects to mixer blade 12 and includes the same structures and features except for as otherwise described herein as it relates to how the laser cladding buildup 120 is provided as well as the configuration of the peripheral end surface 134 and end tip 142. As shown in this embodiment, the first and second converging surfaces 138, 140 are joined by the rounded end tip 142 upon which the laser cladding buildup 120 is applied.

In this embodiment, one and preferably at least two more layers are applied to the first converging surface 138 and likewise, one and preferably two or more layers are also applied to the second converging surface 140 all in at least partial overlapping relation. The layers 144 on the first converging surface overlap each other and partially overlap those applied to the second converging surface and likewise, those applied to the second converging surface overlap each other and partially overlap those applied to the first converging surface to overall provide the laser cladding buildup 120 that extends over the end tip 142. As can be seen, clad material is built up over the end tip 142 as well as along the converging surfaces 138, 140.

Further, this embodiment provides an enlarged head 152 as a result of the laser clad buildup 120 that extends beyond the extents of converging surfaces 138, 140. As a result, a reduced neck 154 is formed behind the laser clad buildup. The reduced neck provides protection to the base steel material of the cutting blade body preventing erosion to the base steel material whereat the clad material is deposited and fused. To provide for this finished product, the sharpening of only some of the buildup 120 that may be less than one layer thick of removal or between 1-2 layers thick). As a result, the second material remains built up and overlapping relation along at least one of the converging surfaces and typically, both converging surfaces 138, 140. None of the base support material (e.g. steel) of the cutting blade body may be removed in some embodiments after cladding operations. This provides a thickened region proximate the cutting edge that is thicker in cross section then the cutting edge support surface 136 (according to the cross section shown in FIG. 10, which is taken through a plain extending through each of the side surfaces and generally perpendicular to the cutting edge).

Further, and as will be described in the next embodiment and as shown in FIGS. 19a-19g, cladding with multiple layers 144 is accomplished with different approaches to the cutting blade body 124 with at least a first approach that is long and from the top side surface 126 and a second different approach that is at least partially from and along the bottom side surface 128.

Otherwise, the other additional features including laying at multiple locations upon teeth and the provision for mounting holes to enable use with the agricultural feed mixer 14 is also provided in this embodiment.

Turning now to FIGS. 12-14, yet a further embodiment of the present invention is provided, which is similar to the last embodiment of the mixer blade 112, however, in this embodiment, the cutting blade body 224 include first and second converging surfaces 238, 240 that are adjoined at a sharpened end tip 242 (as opposed to rounded end tip 142 or flattened end tip 42 in previous embodiments). The sharpened end tip 242 provides along with the converging surfaces 238, 240 the cutting edge support surface 236. Likewise, the laser cladding buildup 220 is formed along the converging surfaces 238, 240 like the previous embodiment.

Turning to additional FIGS. 19*a*-19*f*, a progression of forming different layers 244 *a-g* on opposing sides of the converging surfaces 238, 240 is shown with different approaches of a laser clad tool 58 that approach the cutting blade body 224 alternatively from a top side surface 226 and bottom side surface 228 in alternating fashion to form layers 244 *a-g* as shown in this embodiment. It will be appreciated that more or less layers may be formed, but generally at least four layers are performed in most embodiments.

Figure 19A:
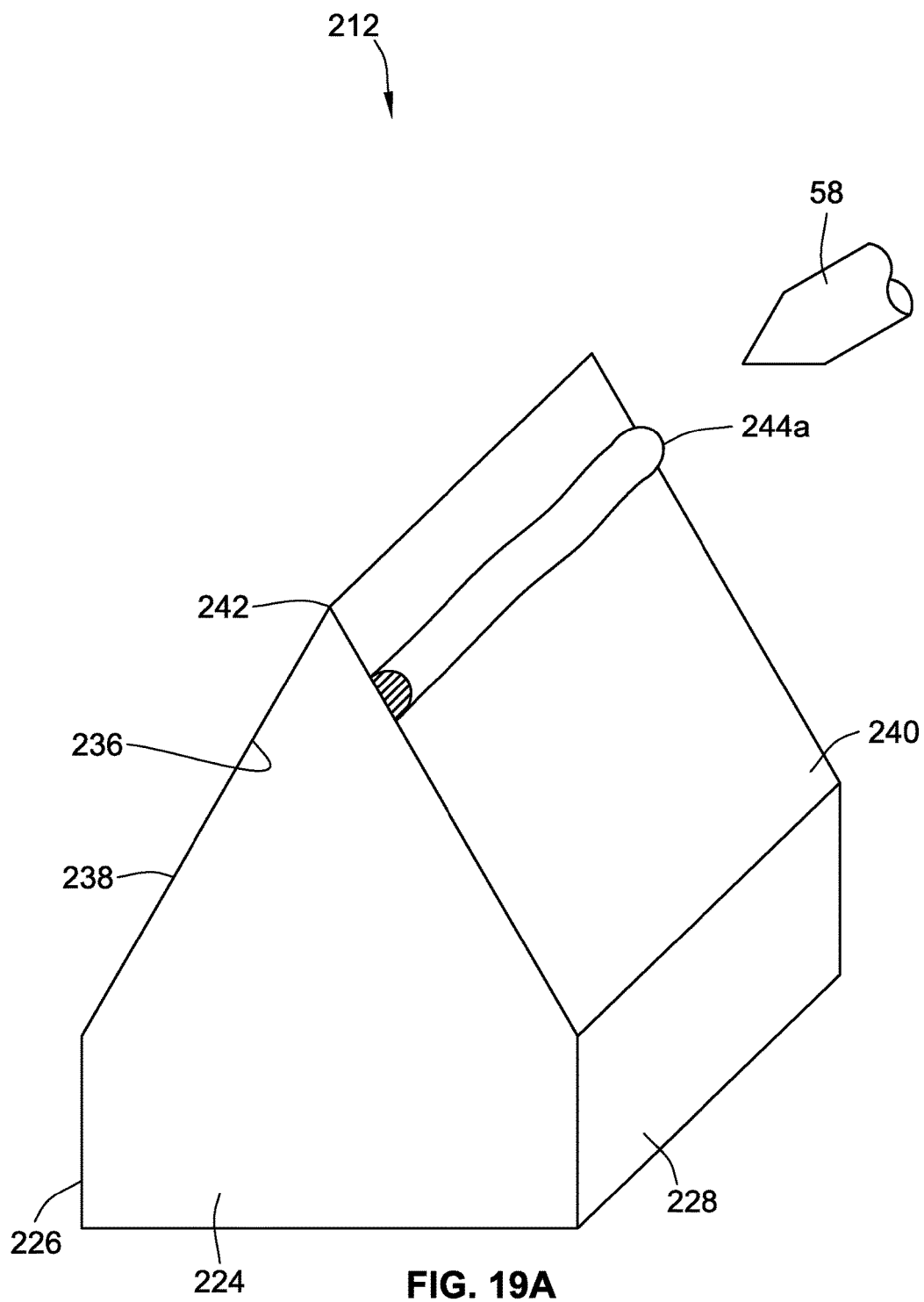
FIGS. 19a-19g are a progression of perspective and partially schematic views of laser cladding adhesive buildup upon a blade edge in accordance with an embodiment of the present invention and that may be used with any of the embodiments discussed above.
Figure 19B:
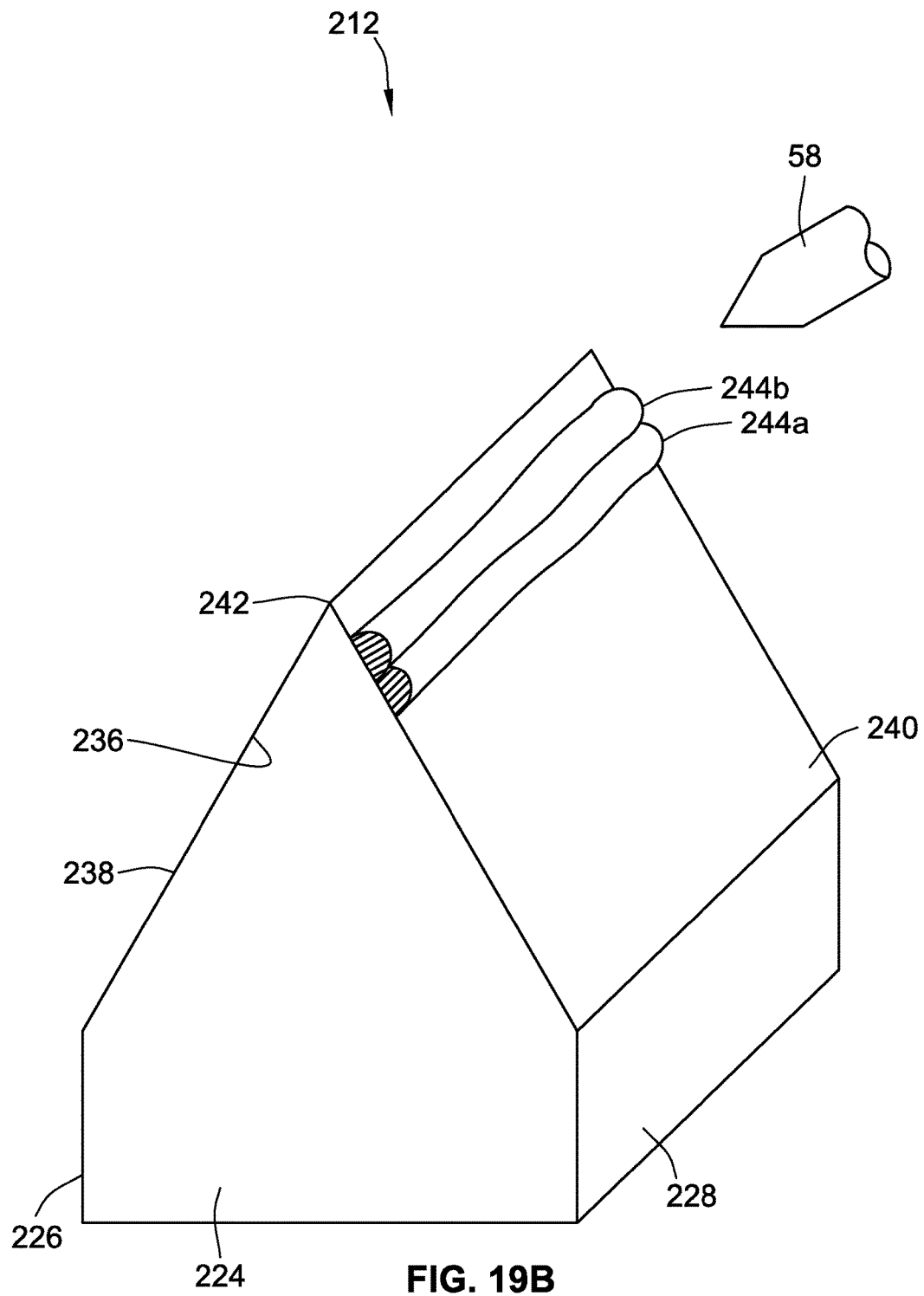
Figure 19C:
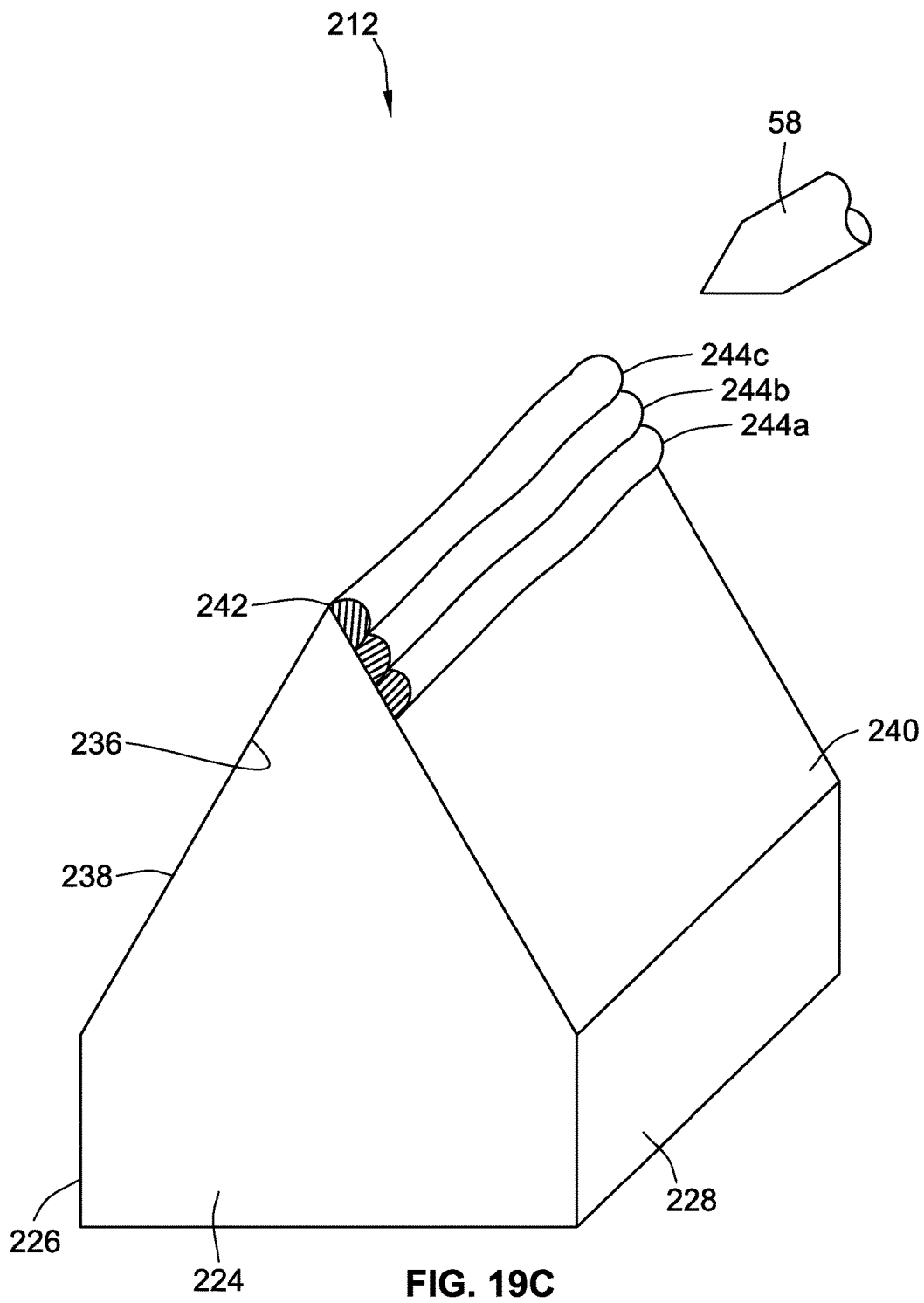
Figure 19D:
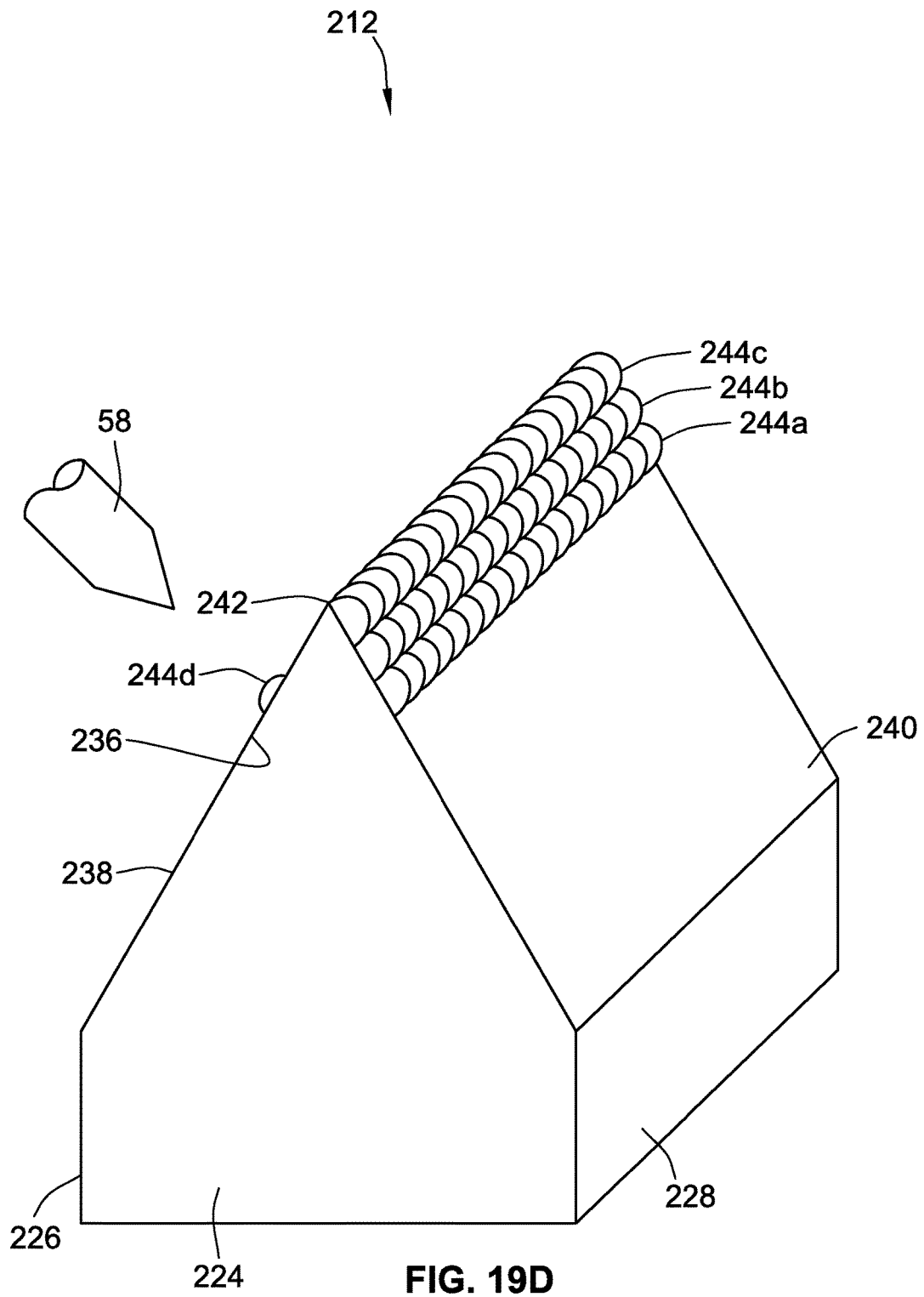
Figure 19E:
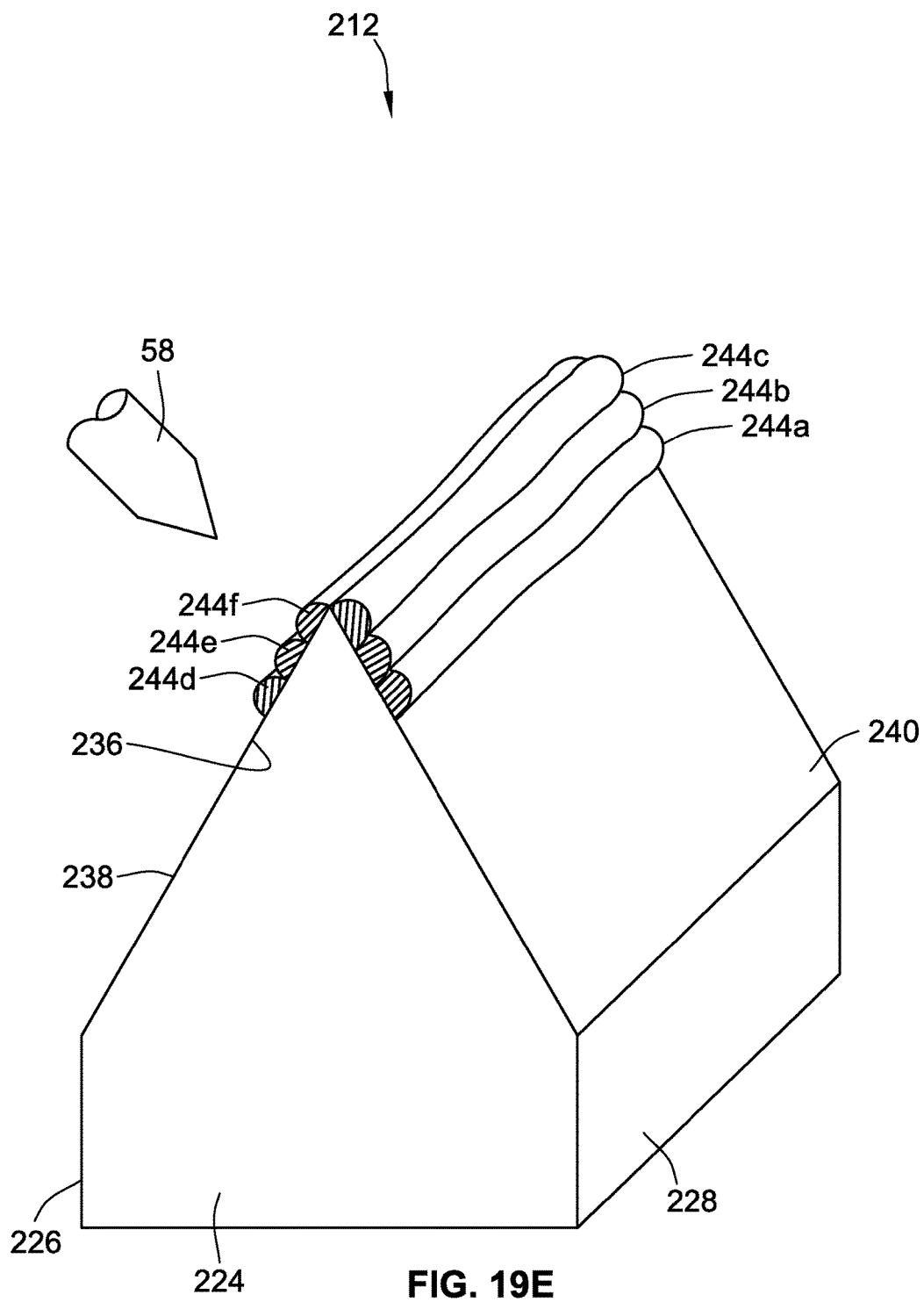
Figure 19F:
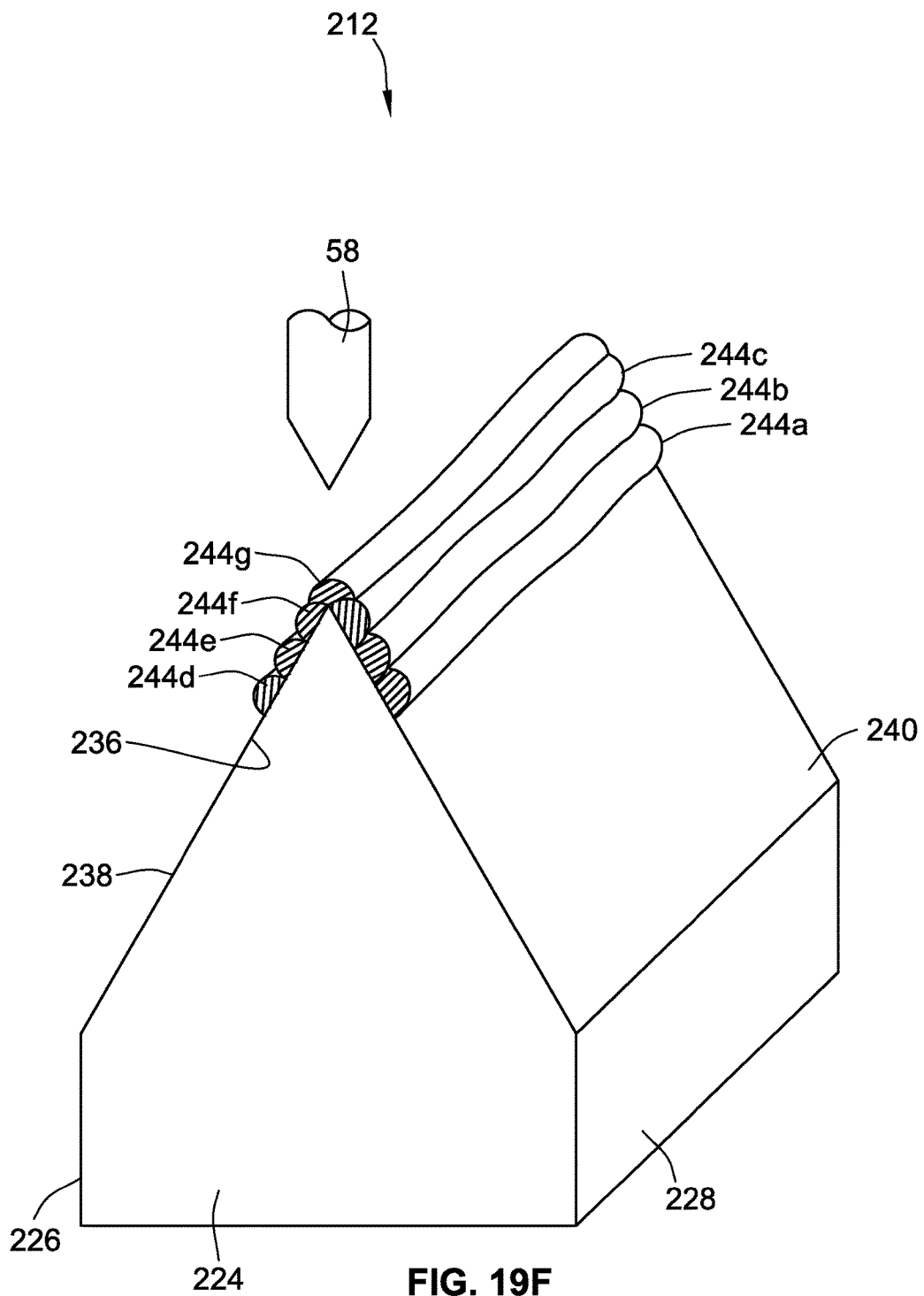
Figure 19G:
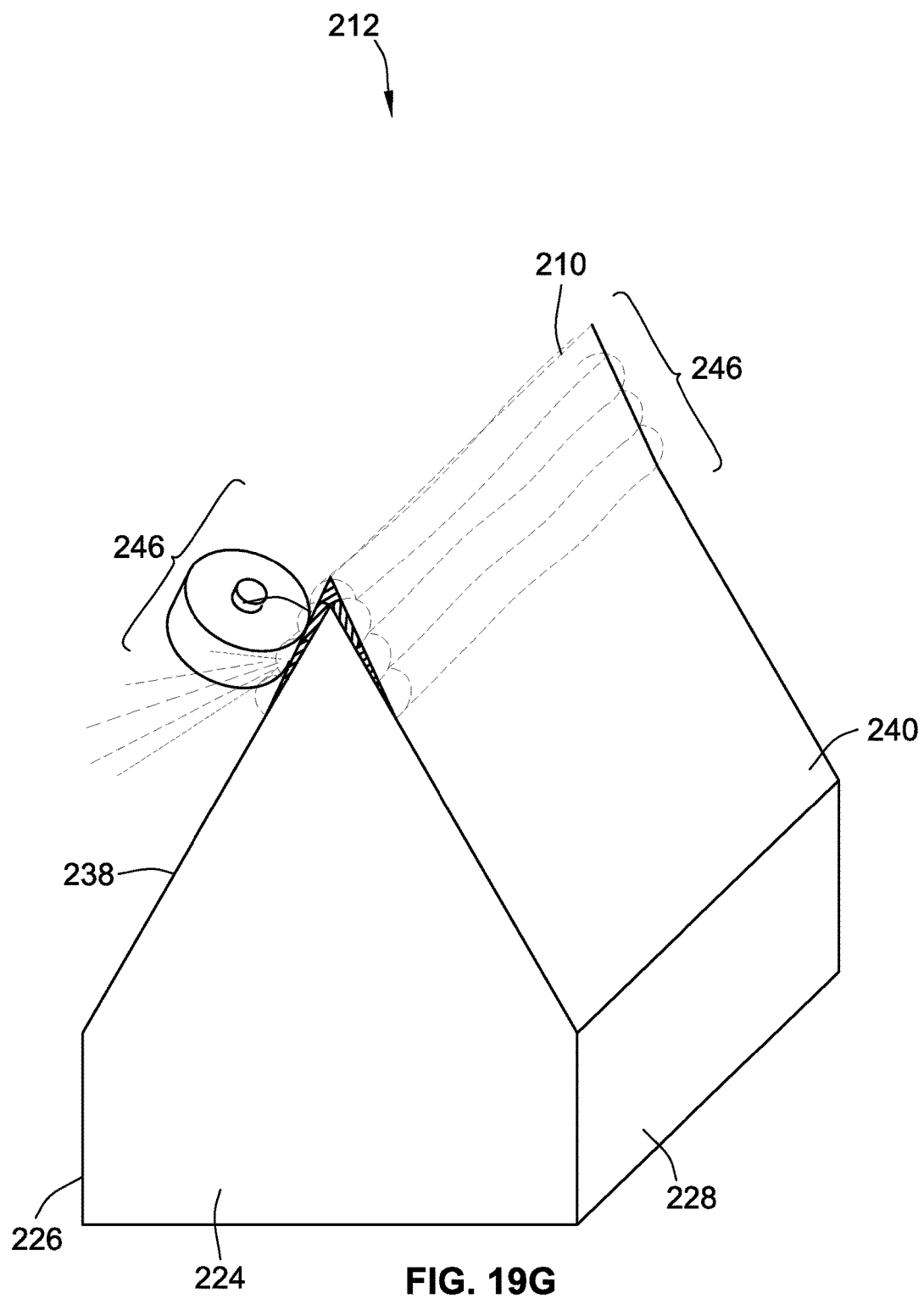

Further, it can be seen that the layers partially overlap each other with the layers on opposing sides overlapping partially at the end tip 242 and with layers on the same sides overlapping each other in substantially complete relation to sandwich intermediate layers therebetween. As can be seen each layer 244*a-g* is laid in a different location and spacing from the end tip, with adjacent layers in contact and thereby partial overlap. This overall, provides for a laser clad buildup 220 on the cutting edge support surface 236, which may be sharpened as shown in FIG. 19*g* by way of a grinding which removes material on each side of the laser cladding buildup 220 to create converging flanks 246. This provides, when sharpened, an overall laser clad cutting edge 210 which can then be used for the agricultural feed mixer 14 as shown in other figures. Preferably, prior to sharpening and after all of the layers 244 *a-g* are built up upon the cutting edge support surface 236, a heat treatment may be performed to harden and temper the combination of the steel cutting blade body and the laser clad buildup. Thereafter, it can be sharpened to form the cutting edge to form a sharpened edge.

As to application of individual layers 244 *a-g* (or the other layer 144 or 44 A-F in prior embodiments see also FIG. 20), the teachings and disclosure of U.S. Pat. No. 8,096,221 to Tarrerias or U.S. Pat. No. 7,677,843 to Techel et al. may be applied including any of the materials and additional treatment indicated in those disclosures.

It should be noted that any of the parameters and discussion of one of the embodiments is generally applicable to the parameters and may be applied and equally pertains to the disclosure of other embodiments in this application.

Embodiments of the invention also relate to the crop cutting blades 60 of a machine for severing standing crops from the ground to initiate a harvest process, and more particularly to an agricultural mower (such as drum mower 62 or disc mower 64) incorporating a rotary disc-cutter bar 68. The rotary disc cutter-bar 68 is made up of a number of transversely oriented cutter modules having rotatable discs 66 or 67 and carrying the cutting blades 60 to sever standing crop by impact. The cut crop is then conveyed to a conditioning mechanism before being discharged to the ground for drying and subsequent harvesting.

In the use of these mowing machines, the cutting blades are subjected to extremely abrasive wear conditions, and the wear is usually concentrated to the edge and subsequently the tip of the cutting blade causing this blade edge and knife tip to become rounded and dull. As the blade edge and tip continue to wear in this manner, the stalks of the crop being cut tend to slide around the outer edge of the cutting blades, causing a number of major problems. This continuous sliding effect multiplies and accelerates the wear on the cutting edge and tip of the cutting blade. The stalks of the crop slide off of the cutting blades instead of being cut. Stalks of the plant material can also be very abrasive themselves, so one would expect that if the stalk is cut upon impact it doesn't slide, thus it doesn't exacerbate the wear on the edge and tip of the cutting blade.

In addition to the excessive cutting blade wear this sliding effect causes, it also stands to reason that if the individual stalks of plant material are sliding off the end and not being cut on every rotation of the disc 66, there is a cutting efficiency loss. The plant material continues to be pushed forward in the direction of machine travel. Eventually the plant stalk material overcomes the pushing force because of the stalk being anchored in the ground, and is severed by the blade on the very tip that is the most dull. Consequently, two very important considerations are impacted by this effect. One, there is a desire in this process to have a clean cut which is of a consistent height from ground level. This helps in the re-growth effort of the crop being grown. In this case, both of those desires will not be met. Two, because of the fact that a large percentage of the crop stalks are being severed by the dullest part of the cutting blade, it takes a much greater force to keep the discs rotating at the desired velocity. This equates to higher horse power requirements and increased fuel usage which is one of the main components in the cost of performing this process.

An embodiment invention of using laser cladding 70 to create the cutting edge 72 of this blade 60 has several benefits. First, because of laser claddings increased surface properties the edge of these blades would be more resistant to wear. Allowing these blades to cut on contact for a longer period of time and preventing the excessive tip wear seen on standard blades. Secondly, because of the previously stated advantage these blades wouldn't need to be replaced by the operator as often. Lastly, because of the characteristics of laser cladding these parts will be more resistant to chipping and deformation compared to other hard coated parts on the market today.

Turning in greater detail to the crop cutting blade 60, it can be seen from FIGS. 5-8 that it is provided with a cutting blade body 74 having opposed top and bottom side surfaces 76, 78. The cutting blade body 74 includes a base section that includes mounting apertures 82 for securing the cutting blade 60 to one of the mowers 62, 64, as well as a cutting wing section that define a main plane 86. As can be seen, the cutting wing section is angularly offset from the base section through deformation of a transition section 88. These particular blades are reversible to include different locations where laser cladding 70 is applied along the peripheral end surface and that can provide two sections of a cutting edge support surface 92. At each section of the cutting edge support surface 92, a first converging surface 94 and a second converging surface 96 are provided, which are joined at an end tip 98, which may be one of rounded, flat or pointed, each of which has different features and advantages. The laser cladding 70 can be built up in several layers upon the cutting edge support surface 92 at the different sections or location in any of the ways previously mentioned for the first three embodiments as applied to the mixer blade described above, such as shown in FIGS. 19*a*-19*f* and/or FIG. 20.

In this embodiment, it can also be seen that one of the converging surfaces 94 can be part of the top or bottom surfaces, that is the portion at the peripheral end surface 90 where converging towards the end tip 98 takes place.

In this embodiment, it is shown that the laser cladding is merely situated on the end tip 98 and does not extend over either of the converging surfaces 94, 96. However, as per prior embodiments, and as shown schematically in relation to FIGS. 19a-19g, laser cladding can be done over the converging surfaces as well as the end tip to provide an increased head region at this location. Likewise, the laser cladding 70 is ground sharp to provide the cutting edge 72 formed into the laser clad 70, which is built up upon the cutting edge support surface 92.

In some rotary mowing applications, for example mowing grasses of lawns or golf courses, a rotary blade cuts the plant material primarily by impacting the plant or lawn material to sever it. Accordingly, for this to be effective, the blade needs to impact the material to be cut at a high rate of speed, upwards of 300 feet per second tip speed. Rotating a metal blade at this speed can be dangerous in that some mower blades are hardened through a heat treat process to reduce the amount of wear to the cutting area of the blade.

However, hardening cutting blade may also result in development of an undesirable property in the blade material. As a metallic blade is heat treated to higher hardness, it correspondingly becomes less ductile. Therefore, the wear resistance of the blade needs to be compromised (by lowering the hardness) in order to make it safer (higher ductility) for use in commercial and residential environments.

Some beveled rotary mowing blades are manufactured with a "self-sharpening" feature, whereby a portion of the face of the cutting edge which is opposite the bevel is hardened and/or hard-faced by application of a metallic hard-facing material. In use, the abrasive materials which are being cut will erode the softer metal on the bevel side leaving a sharp cutting edge at the junction of the bevel and the hard-face. This design may be especially effective in certain applications, such as agricultural chopping and grinding equipment.

Unfortunately, the "self-sharpening" design does not work as effectively on agricultural rotary cutting blades in other applications, such as commercial and/or residential rotary lawn mower blades. The environment in which these rotary moving blades are used can be particularly abrasive, and the softer material of the bevel side of the cutting edge erodes quickly, leaving the hard-faced edge exposed to the forces of cutting. The hard-facing material is very hard but also very brittle, and in use, the hard-faced cutting edge begins breaking off and separating from the cutting edge when there is not enough support from the softer, more ductile substrate part of the blade edge.

Figure 25:
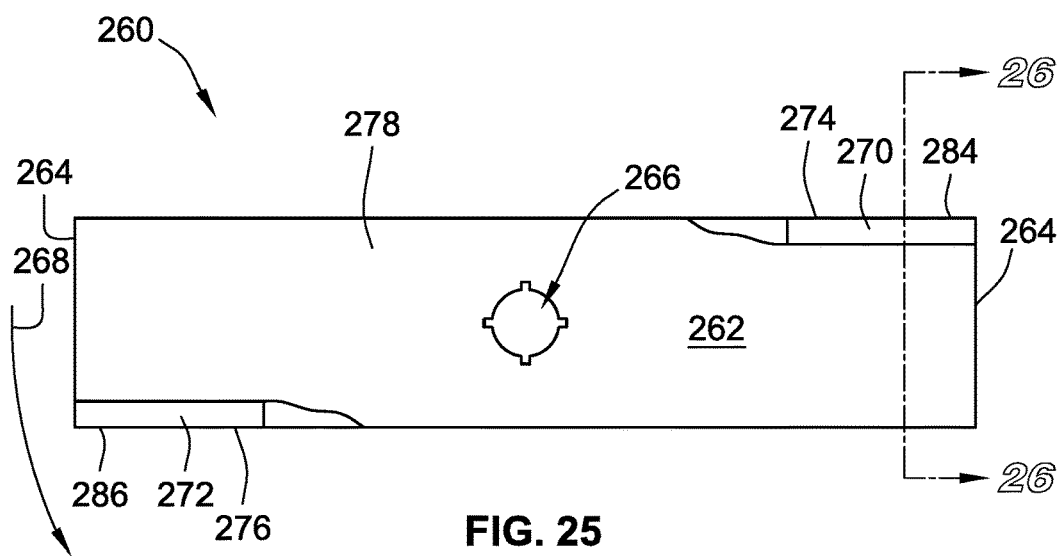
FIG. 25 is a top view of a grass mowing blade in accordance with another embodiment of the present invention.
Figure 26:
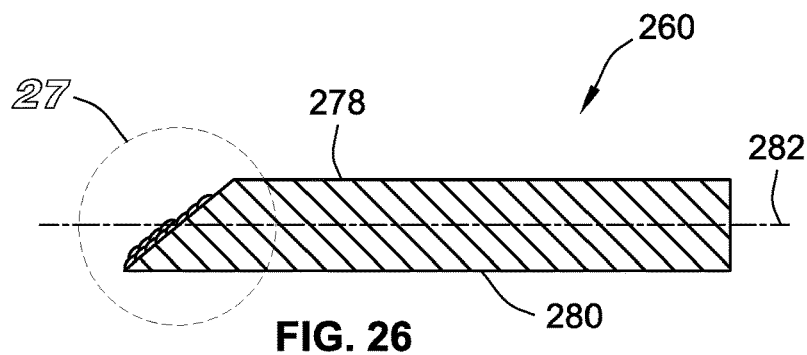
FIG. 26 is a cross-sectional view of the blade shown in FIG. 25.
Figure 27:
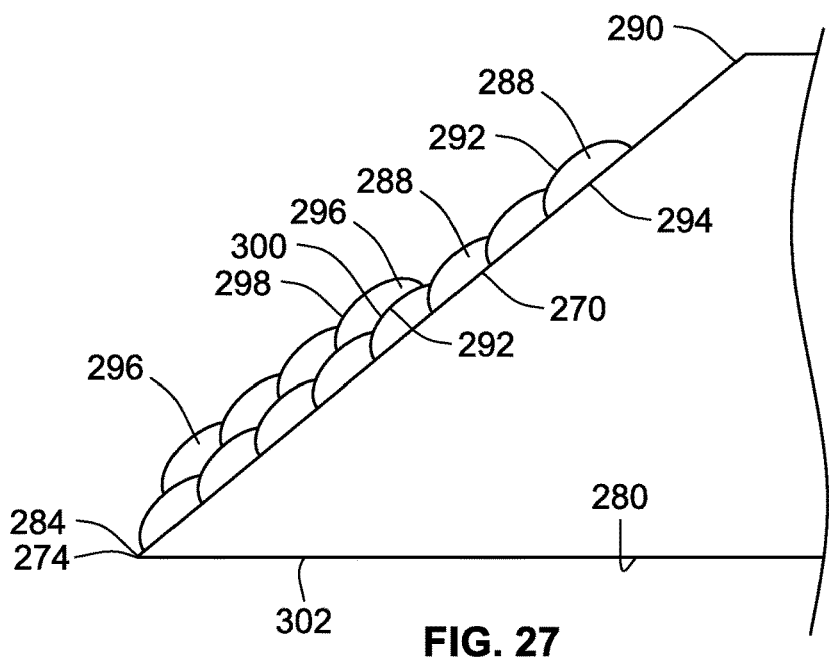
FIG. 27 is an enlarged detail view of a portion of the blade shown in FIG. 26.

Referring to FIGS. 25-27, a rotary lawn mowing blade 260 is shown. Rotary blade 260 includes an elongated body 262 having opposed ends 264 and an annular central mounting aperture 266. From the perspective shown in FIG. 25, rotary blade 260 is configured to rotate counter-clockwise, as shown by arrow 268, around central mounting aperture 266, when rotary blade 260 is mounted to a cutting implement.

Rotary lawn mowing blade 260 is generally formed from a first material such as steel. The cutting blade body 260 may be formed of stock steel material and formed as a blank created from sheet or plate stock material. Material may be removed and sharpened down to the blade profile shown as the beveled surface 270 on the preformed blank.

As best shown in FIGS. 26 and 27, beveled surface 270 extends from first surface 278 to second surface 280. In the orientation shown, first surface 278 may be considered a top surface of the rotary blade 260 and second surface 280 may be considered a bottom surface of the rotary blade 260. Top surface 278 and bottom surface 280 are generally parallel to the plane of rotation 282. As used herein, the plane of rotation is the intended rotary orientation of rotary blade 260 when the blade 260 is mounted to a cutting implement via mounting aperture 266.

Beveled surfaces 270, 272 extend from ends 264 of rotary blade 260 towards central aperture 266 and along leading edges 274, 276 respectively. As shown in more detail in FIGS. 26 and 27, beveled surface 270 intersects bottom surface 280 at leading edge 274, thereby defining a linear cutting edge 284. Similarly, beveled surface 272 intersects bottom surface 280 at leading edge 276, thereby defining a linear cutting edge 286. It will be appreciated by those of skill in the art that the additional descriptions below relating to beveled surface 270 apply equally to opposing beveled surface 272.

When rotary blade 260 is rotated about a shaft or spline coupled to central mounting aperture 266 in the plane of rotation 282, linear cutting edges 284, 286 at leading edges 274, 276 impact a plant material, e.g. a grass, to be cut. The plant material to be cut also impacts upon and contacts beveled surfaces 270, 272, thereby lifting the cut material away from the ground surface.

In contrast, leading portion 302 of bottom surface 280 does not appreciably contact the cut material when rotary blade 260 is rotated in plane of rotation 282. The leading portion 302 therefore constitutes a protected surface that does not impact the plant or lawn material to be cut, and is less subject to abrasion and resulting erosion of the material of the protected surface.

In some prior art embodiments, a hardening process is applied to leading portion 302 of bottom surface 280 proximate to leading edge 274. When leading portion 302 of bottom surface 280 of rotary blade 260 is harder in comparison to beveled surface 270, the blade material of beveled surface 270 distal to leading edge 274 will wear at a faster rate than the blade material of beveled surface 270 and leading portion 302 proximate to leading edge 274. In theory, this increase wear rate experienced at beveled portion 270 distal to linear cutting edge 284 will result in a blade that is self-sharpening, that is, the angle between bottom surface 280 and beveled surface 270 will decrease, thereby sharpening the linear cutting edge 284.

However, as discussed above, it has been determined that hardening the leading portion 302 of bottom surface 280 can wear away the more ductile material present at beveled surface 270, thereby leaving such hardened material unsupported by a more ductile material of beveled surface 270. As hardened material present at leading portion 302 of bottom surface 280 loses support it become more prone to brittle fracture in the abrasive environments associated with lawn and grass moving. Thus, the self-sharpening design of some prior art designs is unexpectedly prone to premature blade wear, necessitating replacement sooner than would otherwise be required.

In contrast, the cutting blade 260 of the present invention is provided with a hard facing material applied to at least a portion of beveled surface 270. In a preferred embodiment, the hard facing material is a laser cladding material, shown as laser cladding beads 288 and 296. The hard facing material thereby reduces wear experienced by beveled surface 270 even in particularly abrasive cutting environments. However, the rotary blade 260 does not retain the self-sharpening feature attributable to more rapid wear of a softer, ductile metal at beveled surface 270.

In the embodiment shown in FIG. 27, the hard facing material is applied to approximately 80 percent of beveled surface 270. In other embodiments, the hard facing material is applied to at least 25 percent, at least 50 percent, at least 75 percent, or at least 90 percent of beveled surface 270. In a preferred embodiment, the hard facing material is not applied to the bottom side surface 280.

The laser cladding material may include at least one of the following: tungsten carbide, titanium carbide, chrome carbide, iron carbide, diamond, ceramic or other material having a Vickers scale hardness between HV 1200-2500. In a preferred embodiment, the laser cladding beads 288, 296 are not further sharpened to form a sharpened tip at linear cutting edge 284. In other embodiments, the tip may be sharpened by machining, grinding, or lapping to form a sharpened tip at linear cutting edge 284.

As best shown in FIG. 27, a first layer of laser cladding material is applied as a bead 288 to beveled surface 270. The length of each layer is laid longitudinally and thereby run along the linear cutting edge 284 and generally parallel thereto. Layers are laid to the base steel blade material side by side overlapping each other at adjacent sides to cover the base metal material at interface zone 294. In a particular embodiments, the first layer has a thickness between about 0.3 mm and 3.0 mm, and preferably between about 0.45 mm and 0.55 mm.

A second layer 296 is also shown built on top of first layer 288 on the top surface 300 if first layer 288. Second layer 296, and additional layers if provided, do not touch the base metal and are laser clad layers in complete overlapping relation with prior layers, e.g. layer 288. In a particular embodiments, the second layer has a thickness between about 0.3 mm and 3.0 mm, and preferably between about 0.45 mm and 0.55 mm.

As shown in this embodiment, two layers 288, 296 are built up upon beveled surface 270 by virtue of multiple passes of a laser cladding tool over the different adjacent side by side locations. In other embodiments, three, four, or five or more layers may be provided. In still other embodiments, second layer 296 need not be generally parallel to first layer 288. For example, first layer 288 may be provided in beads generally parallel to leading edge 274, while second layer 296 may be provided in beads In the embodiment shown, the buildup of layers 288, 296 on beveled surface 270 need not be uniform across the entire area of beveled surface 270. In particular, first layer 288 is provided atop approximately 80 percent of beveled surface 270, while second layer 296 is provided atop approximately 50 percent of beveled surface 270. In the embodiment shown first layer 288 and second layer 296 are both provided proximate to leading edge 274 and extending upwards in the direction of upper rim 290 of beveled surface 270. Accordingly, top surface 298 of second layer 296 will be exposed to wear by cut materials in the area of beveled surface 270 most proximate to cutting edge 274, while top surface 292 of first layer 288 will be exposed to wear by cut materials distal to leading edge 274.

The laser cladding process introduces a coating material into a melt pool extending slightly into the underlying base metal, for example at interface zone 294 between laser cladding bead 288 and beveled surface 270. The energy from the laser subsequently melts the binding materials of the coating material resulting in a true metallurgical bond between the coating and the base material at interface 294. When applied, the laser cladding material may have a greater hardness and/or wear resistance than the underlying base metal of rotary blade 260. In particular, where the laser cladding material has a higher metallurgical hardness than the base metal of rotary blade 260, the laser cladding material may also be less ductile and more brittle than the base metal of rotary cutting blade 260.

Following application of laser cladding material 288, and additional layers if provided, rotary blade 260 may further be heat treated. In a preferred embodiment, the heat treatment is an austempering process that is applied uniformly to the entire rotary cutting blade 260. A heat treatment process applied to the entire rotary blade 260 may thereby reduce the metallurgical hardness of the laser cladding material, but improve the retention of the laser cladding material on the base metal of the rotary blade 260 when the blade is subjected to impacts (e.g., ground, rocks, or other obstacles) during operation.

In other aspects, a portion of the rotary cutting blade may be hardened. In one embodiment, a portion of lower bottom surface 280, for example leading portion 302, may be heat treated to a metallurgical hardness greater than the hardness of the base metal of rotary cutting blade 260. For example, leading portion 302 proximate to leading edge 274 may be heat treated, for example laser heat treated, while the remainder of bottom surface 280 is not heat treated.

Figure 17:
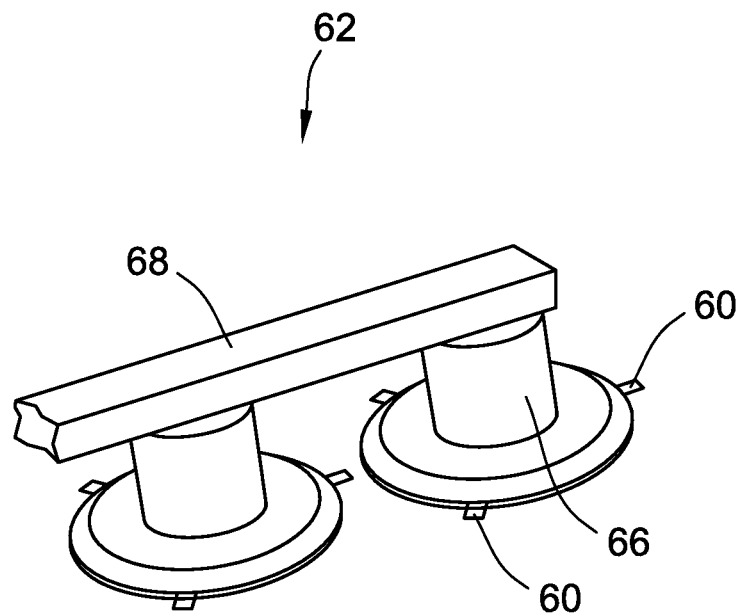
FIGS. 17 and 18 are embodiments of drum mowers and disc mowers shown in prospective views, which include the blade utilized in the embodiment of FIGS. 5-7.
Figure 18:
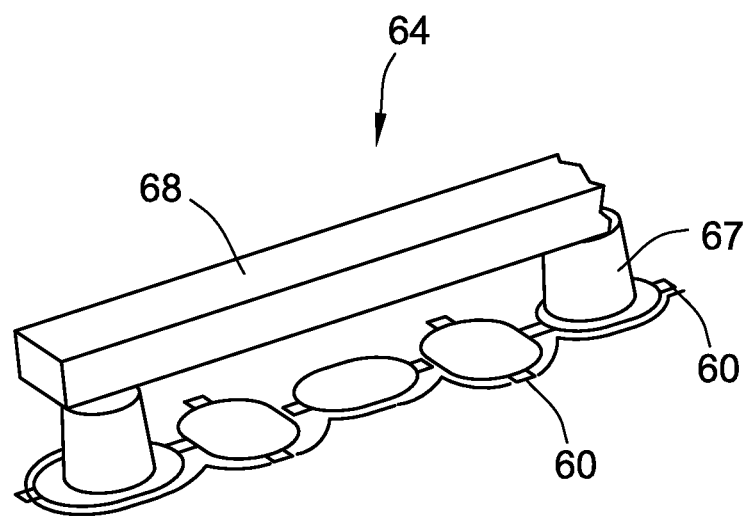

Referring to FIGS. 21-24, another embodiment of a crop cutting blade is shown. Blade 61 is provided with a cutting blade body 74 having opposed top and bottom side surfaces 76, 78. The cutting blade body 74 includes a base section that includes mounting apertures 82 for securing the cutting blade 61 to one of the mowers 62, 64 (similarly to blade 60, as shown in FIGS. 17 and 18), as well as a cutting wing section that defines a main plane 86. As can be seen, the cutting wing section is angularly offset from the base section through deformation of a transition section 88.

Figure 24:
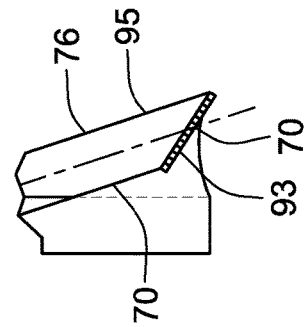
FIG. 24 is an enlarged detail view of a portion of the knife shown in FIG. 23.
Figure 21:
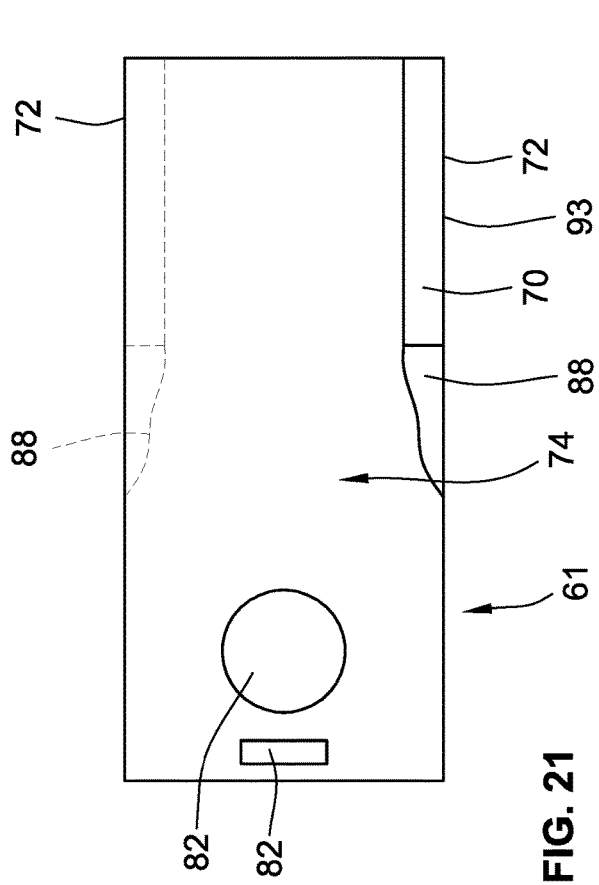
FIG. 21 is a top view of a clock-wise knife (also referred to as "crop cutting blade") having a laser clad cutting edge in accordance with an embodiment of the present invention.
Figure 23:
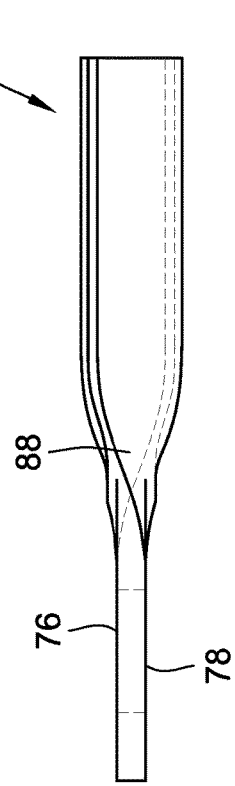
FIG. 23 is a front side view of the blade shown in FIG. 21.

A beveled face 93 and a protected converging surface 95 are provided, which intersect to define cutting edge 72. Laser cladding 70 is applied to beveled face 93 to define a cutting edge impact surface 93. In a preferred embodiment, laser cladding 70 is a continuous layer on beveled face 93 and extends from cutting edge 72 towards bottom side surface 78. As shown in FIG. 24, laser cladding 70 may cover the entirety of beveled surface 93. In other embodiments, laser cladding 70 may cover at least 90 percent, at least 75 percent, or at least 50 percent of cutting edge impact surface 93, extending from cutting edge 72 towards bottom side surface 78.

As discussed above, laser cladding 70 can be built up in several layers upon the cutting edge impact surface 93. In a preferred embodiment, laser cladding 70 is applied to cutting edge impact surface 93 and tip 98, but is not applied to protected converging surface 95.

The Feed Mixer blades and Disc Mower blades are just a few examples of cutting blades this invention would be applicable on and the advantages of using laser cladding technology for the cutting edge for these blades. Other cutting blades this invention would be applicable on but not limited to are: Straw chopper blades, Sugar Cane blades, & Forage Harvestor blades. All these blades are common in the agricultural industry and would benefit from the advantages of this invention in similar ways as stated from the two previous examples (Feed Mixers & DMK blades). These other applications are covered herein.

Based on the foregoing, it is recognized that one or more of the following potential advantages and novel features or advantages may be realized according to different embodiments below:

Using laser cladding to create a cutting edge would give the blade edge superior hardness preventing wear.

Laser cladding creates a strong bond with the substrate preventing chipping of laser clad material and improving blade life.

Laser cladding provides good corrosion resistance improving the life of the blade edge.

Laser cladding can be configured to match existing part dimensions; this allows for parts to be a direct replacement for existing blades.

There is a wide range of options when choosing laser cladding material which makes laser cladding a very unique and versatile process that can be used for a variety of different applications.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A rotary cutting blade configured to mount to a rotary power output of a mower, the rotary cutting blade comprising:
    a cutting blade body, the cutting blade body having a first side surface and a second side surface, the second side surface extending in a direction of a longitudinal axis of the cutting blade body and between opposed ends of the cutting blade body, the first and second side surfaces including respective regions of a cutting section that are parallel adjacent a beveled surface portion, wherein the cutting blade body is formed of a first material;
    the beveled surface portion located between the first side surface and the second side surface, and the beveled surface portion is proximate to at least one of the opposed ends, the intersection between the beveled surface portion and the second side surface defining a cutting edge;
    a second material applied to the beveled surface portion, wherein the second material covers at least 25 percent of the beveled surface portion, wherein the second material provides at least one of greater hardness and wear resistance relative to the first material, wherein the second material is a laser cladding material; and
    wherein the laser cladding is applied only to the beveled surface portion and the first or second side surfaces are free of the laser cladding.

2. The rotary cutting blade of claim 1, wherein the cutting blade body comprises a mounting aperture and a plane of rotation, and wherein the second side surface is parallel to the plane of rotation.

3. The rotary cutting blade of claim 1, wherein the cutting blade body comprises a mounting aperture and a plane of rotation, and wherein the second side surface is not parallel to the plane of rotation and is a protected surface when the rotary cutting blade is rotated in the plane of rotation.

4. The rotary cutting blade of claim 1, wherein the second material is applied to the beveled surface portion at a first thickness proximate to the cutting edge, and at a second thickness distal to the cutting edge.

5. The rotary cutting blade of claim 4, wherein the first thickness is greater than the second thickness.

6. The rotary cutting blade of claim 4, wherein the first thickness is between 0.3 mm and 3.0 mm, and wherein the second thickness is between 0.3 mm and 3.0 mm.

7. The rotary cutting blade of claim 1, wherein the rotary cutting blade is heat treated.

8. The rotary cutting blade of claim 7, wherein the rotary cutting blade is austempered.

9. The rotary cutting blade of claim 1, wherein the second material contacts the cutting edge.

10. The rotary cutting blade of claim 1, wherein the second material covers at least 50 percent of the beveled surface portion.

11. The rotary cutting blade of claim 1, wherein the second material covers less than 100 percent of the beveled surface portion with the laser cladding is applied to only a portion of the beveled surface portion leaving an uncovered portion along the beveled surface portion spacing the laser cladding from at least one of the cutting edge and a rim portion corner that intersects the first side surface.

12. The rotary cutting blade of claim 11 for cutting plant material, wherein the cutting body defines a mounting aperture to provide the cutting body with a predetermined direction of rotation with a peripheral tip end spaced from the mounting aperture, wherein the cutting edge span radially inward from the tip end toward the mounting aperture along a leading edge of the cutting body, and wherein the beveled portion forms a leading face facing the predetermined direction of rotation such that the beveled portion is arranged to impact the crop material when in use.

13. The rotary cutting blade of claim 1 for cutting plant material, wherein the cutting body defines a mounting aperture to provide the cutting body with a predetermined direction of rotation with a peripheral tip end spaced from the mounting aperture, wherein the cutting edge span radially inward from the tip end toward the mounting aperture along a leading edge of the cutting body, and wherein the beveled portion forms a leading face facing the predetermined direction of rotation such that the beveled portion is arranged to impact the crop material when in use.

14. The rotary cutting blade of claim 1, wherein the first and second side surfaces are generally planar and extend parallel in a direction extending perpendicular to the longitudinal axis away from the beveled surface portion, with the cutting edge including respective cutting edge portions at opposed ends on opposite sides of a central mounting aperture.

15. The rotary cutting blade of claim 1, the opposed ends including a first opposed end and a second opposed end, the cutting blade body including a base section, a transition section and a cutting wing section, the base portion including a the mounting aperture nearer the first opposed end than the second opposed end, the base section extending in a direction parallel to the longitudinal towards the second opposed end to the transition section, the transition section extending to the cutting wing section, the cutting wing section extending to the second opposed end, wherein the transition section provides an angular offset relative to the base section.

16. A rotary cutting blade configured to mount to a rotary power output of a mower, the rotary cutting blade comprising:
   a generally planar top surface and a generally planar bottom surface, the generally planar bottom surface being parallel to a rotational plane of the rotary cutting blade; the generally planar bottom surface extending parallel to the rotational plane and between opposed ends of the rotary cutting blade;
   a beveled surface portion located between the top surface and the bottom surface, and the beveled surface portion is proximate to at least one of the opposed ends, the intersection between the beveled surface portion and the bottom surface defining a cutting edge;
   a hard facing material applied to the beveled surface portion, wherein the hard facing material does not extend to cover the generally planar bottom surface, and wherein the hardfacing material is a laser cladding material; and wherein the laser cladding is applied only to the beveled surface portion and top and bottom surfaces are free of the laser cladding.

17. The rotary cutting blade of claim 16, wherein the entire rotary cutting blade is heat treated.

18. The rotary cutting blade of claim 16, wherein one or more portions of the rotary cutting blade are heat treated.

19. The rotary cutting blade of claim 16, wherein the hard facing material is applied to the beveled surface portion at a first thickness proximate to the cutting edge, and a second thickness distal to the cutting edge.

20. The rotary cutting blade of claim 16, wherein the second material covers less than 100 percent of the beveled surface portion with the laser cladding applied to only a portion of the beveled surface portion leaving an uncovered portion along the beveled surface portion spacing the laser cladding from at least one of the cutting edge and a rim portion corner that intersects the top surface.

21. The rotary cutting blade of claim 20 for cutting plant material, wherein the cutting body defines a mounting aperture to provide the cutting body with a predetermined direction of rotation with a peripheral tip end spaced from the mounting aperture, wherein the cutting edge span radially inward from the tip end toward the mounting aperture along a leading edge of the cutting body, and wherein the beveled portion forms a leading face facing the predetermined direction of rotation such that the beveled portion is arranged to impact the crop material when in use.

22. The rotary cutting blade of claim 16 for cutting plant material, wherein the cutting body defines a mounting aperture to provide the cutting body with a predetermined direction of rotation with a peripheral tip end spaced from the mounting aperture, wherein the cutting edge spans radially inward from the tip end toward the mounting aperture along a leading edge of the cutting body, and wherein the beveled portion forms a leading face facing the predetermined direction of rotation such that the beveled portion is arranged to impact the crop material when in use.

* * * * *